(12) United States Patent
Huang et al.

(10) Patent No.: US 10,834,704 B2
(45) Date of Patent: Nov. 10, 2020

(54) METHOD AND APPARATUS FOR RESOURCE SELECTION IN SIDELINK TRANSMISSION IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/824,435

(22) Filed: Mar. 19, 2020

(65) Prior Publication Data
US 2020/0305127 A1  Sep. 24, 2020

Related U.S. Application Data

(60) Provisional application No. 62/822,408, filed on Mar. 22, 2019.

(51) Int. Cl.
| | | |
|---|---|---|
| *H04W 72/02* | (2009.01) | |
| *H04W 72/04* | (2009.01) | |
| *H04L 5/00* | (2006.01) | |
| *H04W 4/40* | (2018.01) | |

(Continued)

(52) U.S. Cl.
CPC .......... *H04W 72/02* (2013.01); *H04L 5/0007* (2013.01); *H04W 4/40* (2018.02); *H04W 52/52* (2013.01); *H04W 72/0446* (2013.01); *H04W 72/0453* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2016/0095131 A1* | 3/2016 | Seo ................... | H04W 72/0413 370/329 |
| 2019/0037509 A1* | 1/2019 | Li ...................... | H04W 56/001 |
| 2019/0044667 A1* | 2/2019 | Guo .................... | H04L 1/1816 |

(Continued)

*Primary Examiner* — Chi H Pham
*Assistant Examiner* — Vladislav Y Agureyev
(74) *Attorney, Agent, or Firm* — Blue Capital Law Firm, P.C.

(57) ABSTRACT

A method and apparatus are disclosed from the perspective of a first device for performing sidelink transmission to a second device. In one embodiment, the method includes the first device being configured with a first resource pool for sidelink transmission. The method includes the first device being configured with only a first number of consecutive symbols in each slot for sidelink such that each slot in the first resource pool comprises only one subset of consecutive symbols for sidelink and the subset of each slot comprises the same first number of consecutive symbols, wherein the first number of consecutive symbols in each slot for sidelink is less than all OFDM (Orthogonal Frequency Division Multiplexing) symbols in each slot. The method further includes the first device performing resource selection among a plurality of slots in the first resource pool. In addition, the method includes the first device selecting a first resource in a first slot and a second resource in a third slot. Furthermore, the method includes the first device performing sidelink transmission of a TB (Transport Block) on the first resource and performs sidelink transmission of the TB on the second resource.

23 Claims, 14 Drawing Sheets

(51) Int. Cl.
    *H04W 52/52*     (2009.01)
    *H04W 92/18*     (2009.01)

(56) References Cited

U.S. PATENT DOCUMENTS

| | | | |
|---|---|---|---|
| 2019/0052420 A1* | 2/2019 | Manolakos | H04L 5/0051 |
| 2019/0053267 A1* | 2/2019 | Kim | H04W 76/14 |
| 2019/0110325 A1* | 4/2019 | Gulati | H04W 72/0446 |
| 2019/0229964 A1* | 7/2019 | Ouchi | H04L 5/0058 |
| 2019/0268904 A1* | 8/2019 | Miao | H04W 52/02 |
| 2019/0306923 A1* | 10/2019 | Xiong | H04W 72/042 |
| 2019/0319768 A1* | 10/2019 | Wu | H04W 76/11 |
| 2019/0364585 A1* | 11/2019 | Lee | H04W 4/40 |
| 2019/0387377 A1* | 12/2019 | Zhang | H04W 4/44 |
| 2020/0015176 A1* | 1/2020 | Li | H04L 5/0091 |
| 2020/0029318 A1* | 1/2020 | Guo | H04W 72/042 |
| 2020/0029340 A1* | 1/2020 | He | H04W 4/40 |
| 2020/0037343 A1* | 1/2020 | He | H04W 4/40 |
| 2020/0045715 A1* | 2/2020 | Li | H04W 72/121 |
| 2020/0053528 A1* | 2/2020 | Wang | H04W 72/044 |
| 2020/0053835 A1* | 2/2020 | Ye | H04W 88/06 |
| 2020/0068567 A1* | 2/2020 | Islam | H04L 5/0057 |
| 2020/0100230 A1* | 3/2020 | Lee | H04L 5/06 |
| 2020/0100237 A1* | 3/2020 | Chae | H04L 5/00 |
| 2020/0106566 A1* | 4/2020 | Yeo | H04W 28/04 |
| 2020/0107312 A1* | 4/2020 | Baghel | H04W 72/0406 |
| 2020/0107351 A1* | 4/2020 | Lee | H04L 5/0053 |
| 2020/0128562 A1* | 4/2020 | Hou | H04W 4/00 |

\* cited by examiner

| DCI format | Search Space |
|---|---|
| DCI format 5A | For PDCCH: Common and UE specific by C-RNTI<br>For EPDCCH: UE specific by C-RNTI |

FIG. 5 (PRIOR ART)

| DCI format | Search Space |
|---|---|
| DCI format 5A | For PDCCH: Common and UE specific by C-RNTI<br>For EPDCCH: UE specific by C-RNTI |

FIG. 6 (PRIOR ART)

| SL index field in DCI format 5A | Indicated value $m$ |
|---|---|
| '00' | 0 |
| '01' | 1 |
| '10' | 2 |
| '11' | 3 |

FIG. 7 (PRIOR ART)

| Resource reservation field in SCI format 1 | Indicated value X | Condition |
|---|---|---|
| '0001', '0010', ..., '1010' | Decimal equivalent of the field | The higher layer decides to keep the resource for the transmission of the next transport block and the value X meets $1 \leq X \leq 10$. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

FIG. 8 (PRIOR ART)

METHOD AND APPARATUS FOR RESOURCE SELECTION IN SIDELINK TRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/822,408 filed on Mar. 22, 2019, the entire disclosure of which is incorporated herein in its entirety by reference.

FIELD

This disclosure generally relates to wireless communication networks, and more particularly, to a method and apparatus for resource selection in sidelink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device for performing sidelink transmission to a second device. In one embodiment, the method includes the first device being configured with a first resource pool for sidelink transmission. The method includes the first device being configured with only a first number of consecutive symbols in each slot for sidelink such that each slot in the first resource pool comprises only one subset of consecutive symbols for sidelink and the subset of each slot comprises the same first number of consecutive symbols, wherein the first number of consecutive symbols in each slot for sidelink is less than all OFDM (Orthogonal Frequency Division Multiplexing) symbols in each slot. The method further includes the first device performing resource selection among a plurality of slots in the first resource pool. In addition, the method includes the first device selecting a first resource in a first slot and a second resource in a third slot. Furthermore, the method includes the first device performing sidelink transmission of a TB (Transport Block) on the first resource and performs sidelink transmission of the TB on the second resource.

BRIEF DESCRIPTION OF THE DRAWINGS

FIG. 5 is a reproduction of Table 14.2-1 of 3GPP TS 36.213 V15.3.0.

FIG. 6 is a reproduction of Table 14.2-2 of 3GPP TS 36.213 V15.3.0.

FIG. 7 is a reproduction of Table 14.2.1-1 of 3GPP TS 36.213 V15.3.0.

FIG. 8 is a reproduction of Table 14.2.1-2 of 3GPP TS 36.213 V15.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis #23][NR] Deployment scenarios", NTT DOCOMO; 3GPP RAN2 #94 meeting minute; TS 36.213 V15.3.0 (2018-09), "E-UTRA; Physical layer procedures (Release 15)"; TS 36.212 V15.2.1 (2018-07), "E-UTRA; Multiplexing and channel coding (Release 15)"; TS 36.211 V15.2.0 (2018-06), "E-UTRA; Physical channels and modulation (Release 15)"; R1-1810051, "Final Report of 3GPP TSG RAN WG1 #94 v1.0.0 (Gothenburg, Sweden, 20-24 August 2018)"; R1-1812101, "Final Report of 3GPP TSG RAN WG1 #94bis v1.0.0 (Chengdu, China, 8-12 Oct. 2018)"; Draft Report of 3GPP TSG RAN WG1 #95 v0.1.0 (Spokane, USA, 12-16 Nov. 2018); Draft Report of 3GPP TSG RAN WG1 #AH_1901 v0.1.0 (Taipei, Taiwan, 21-25 Jan. 2019); RP-182111, "Revised SID: Study on NR V2X", LG Electronics; and Draft Report of 3GPP TSG RAN WG1 #96 v0.1.0 (Athens, Greece, 25 Feb.-1 Mar. 2019). The standards and documents listed above are hereby expressly incorporated by reference in their entirety.

Figure 1:
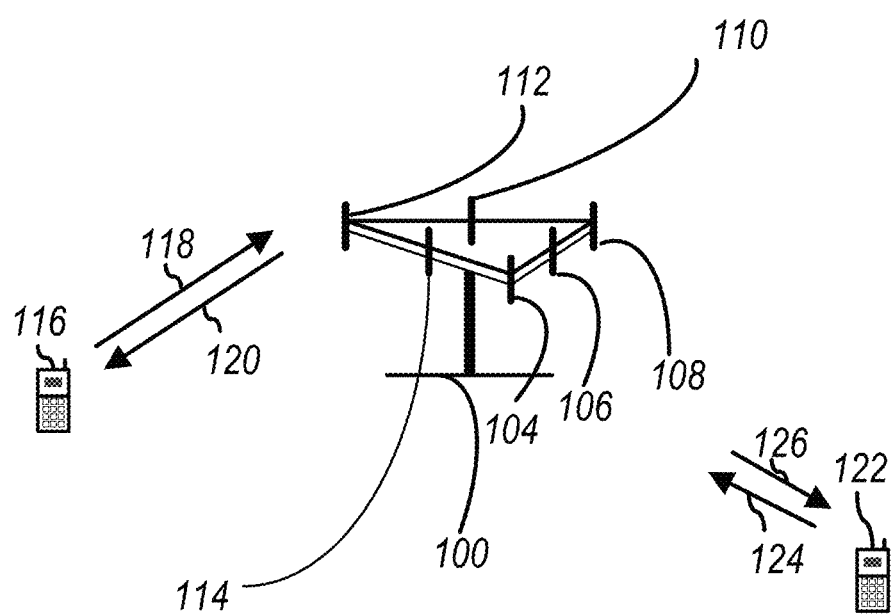
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
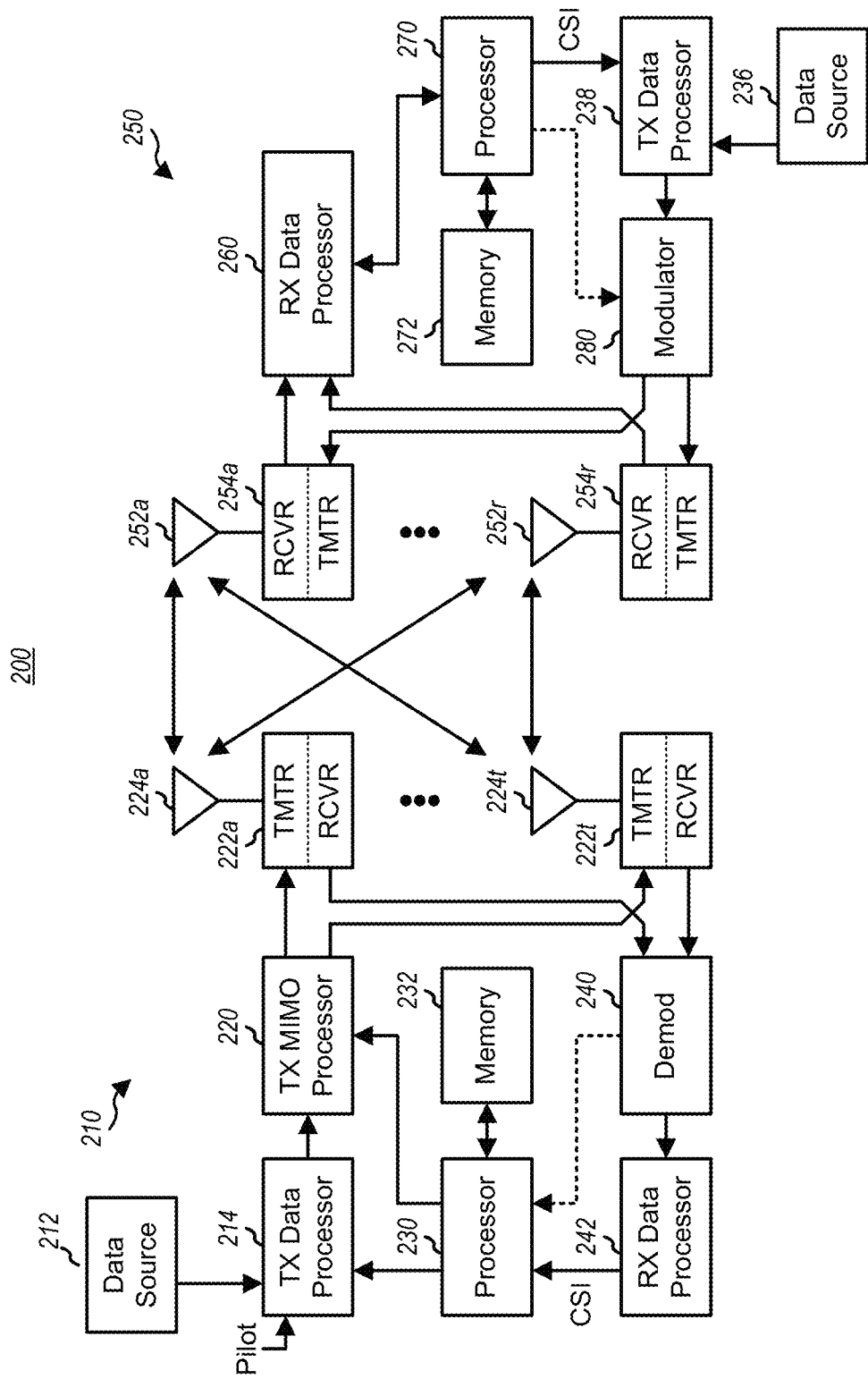
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
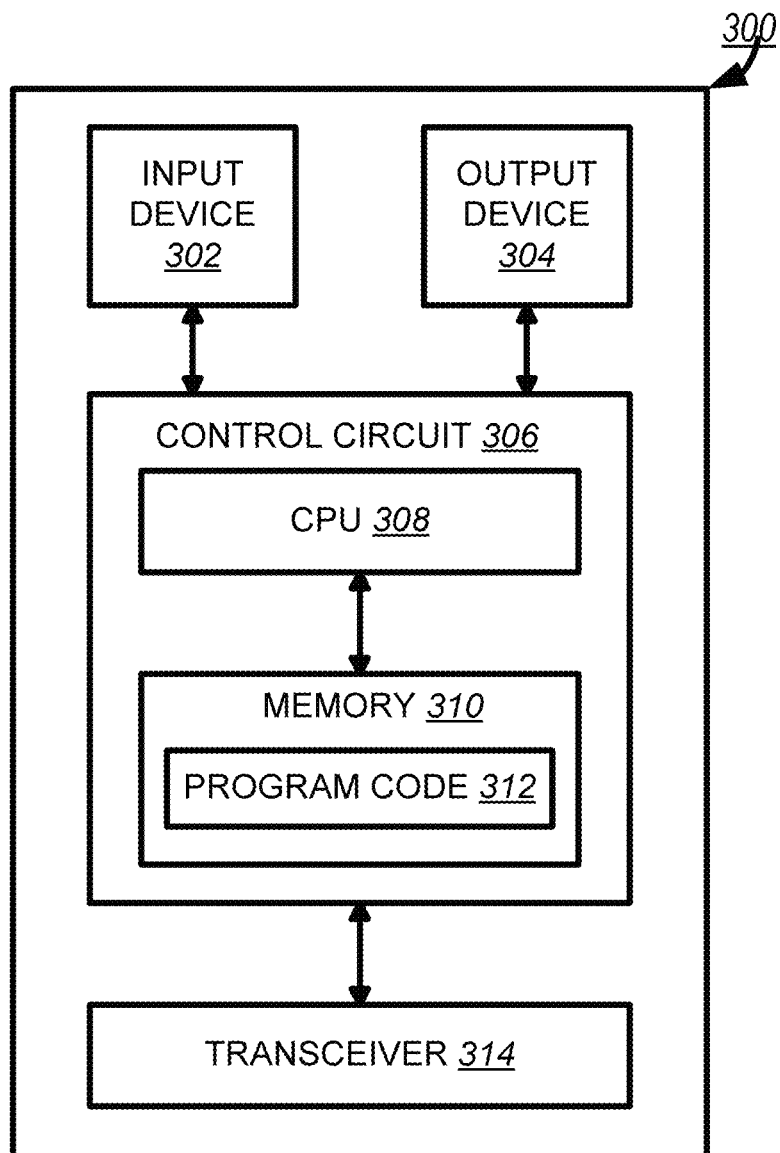
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
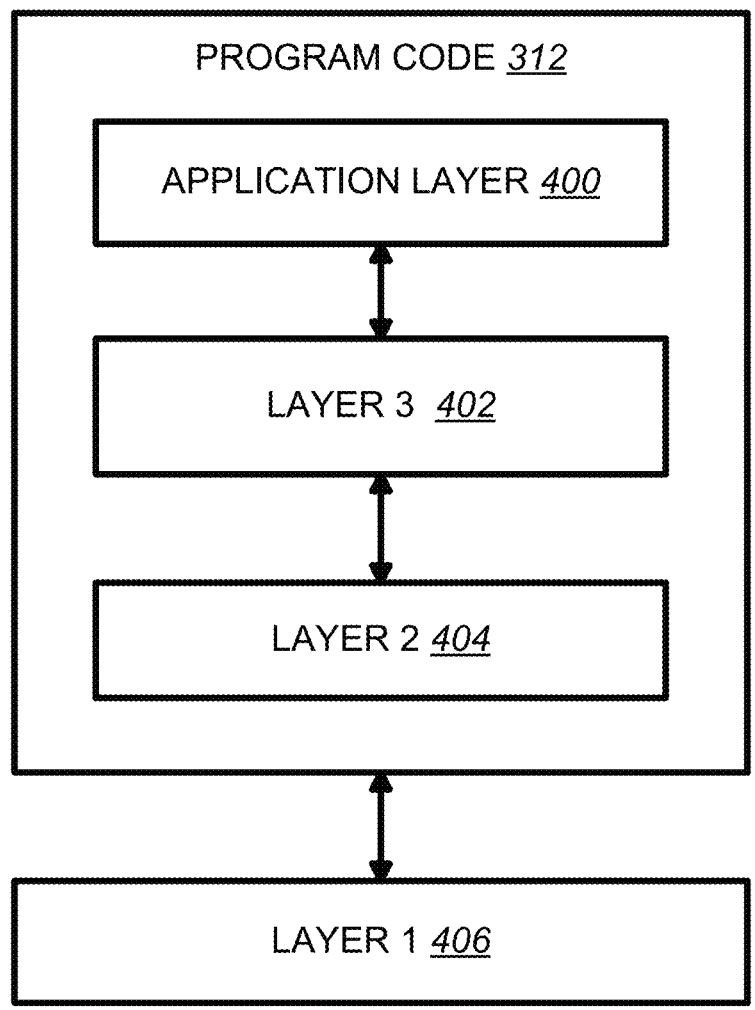
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 specifies the UE procedure for V2X (Vehicle-to-Everything) transmission. The V2X transmissions are performed as sidelink transmission mode 3 or sidelink transmission mode 4 as follows:

14.1 Physical Sidelink Shared Channel Related Procedures
14.1.1 UE Procedure for Transmitting the PSSCH
[ . . . ]
If the UE transmits SCI format 1 on PSCCH according to a PSCCH resource configuration in subframe n, then for the corresponding PSSCH transmissions of one TB
  for sidelink transmission mode 3,
    the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.
  for sidelink transmission mode 4,
    the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.
  if higher layer indicates that rate matching for the last symbol in the subframe is used for the given PSSCH Transmission Format of corresponding SCI format 1 is set to 1,
    the modulation order is determined using the "modulation and coding scheme" field ($I_{MCS}$) in SCI format 1.
    for $0 \leq I_{MCS} \leq 28$, the TBS index ($I_{TBS}$) is determined based on $I_{MCS}$ and Table 8.6.1-1,
    for $29 \leq I_{MCS} \leq 31$, the TBS index ($I_{TBS}$) is determined based on $I_{MCS}$ and Table 14.1.1-2,
    the transport block size is determined by using $I_{TBS}$ and setting the Table 7.1.7.2.1-1 column indicator to $\max\{\lfloor N'_{PRB} \times 0.8 \rfloor, 1\}$, where $N'_{PRB}$ to the total number of allocated PRBs based on the procedure defined in Subclause 14.1.1.4A and 14.1.1.4B.
  otherwise
    Transmission Format of SCI format 1 is set to 0 if present,
    the modulation order is determined using the "modulation and coding scheme" field ($I_{MCS}$) in SCI format 1. For $0 \leq I_{MCS} \leq 28$, the modulation order is set to $Q' = \min(4, Q'_m)$, where $Q'_m$ is determined from Table 8.6.1-1.
    the TBS index ($I_{TBS}$) is determined based on $I_{MCS}$ and Table 8.6.1-1, and the transport block size is determined using $I_{TBS}$ and the number of allocated resource blocks ($N_{PRB}$) using the procedure in Subclause 7.1.7.2.1.
[ . . . ]
14.2 Physical Sidelink Control Channel Related Procedures
[ . . . ]
[Table 14.2-1 of 3GPP TS 36.213 V15.3.0, entitled "PDCCH/EPDCCH configured by SL-RNTI", is reproduced as FIG. 5]
For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.
[Table 14.2-2 of 3GPP TS 36.213 V15.3.0, entitled "PDCCH/EPDCCH configured by SL-V-RNTI or SL-SPS-V-RNTI", is reproduced as FIG. 6]
The carrier indicator field value in DCI format 5A corresponds to v2x-InterFreqInfo.
[ . . . ]
14.2.1 UE Procedure for Transmitting the PSCCH
For sidelink transmission mode 3,
  The UE shall determine the subframes and resource blocks for transmitting SCI format 1 as follows:
    SCI format 1 is transmitted in two physical resource blocks per slot in each subframe where the corresponding PSSCH is transmitted.
    If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} = \frac{N_{TA}}{2} \times T_S + (4+m) \times 10^{-3}.$$

$L_{Init}$ is the value indicated by "Lowest index of the subchannel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} = \frac{N_{TA}}{2} \times T_S + (4+m) \times 10^{-3}.$$

$L_{Init}$ is the value indicated by "Lowest index of the subchannel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3] . . .

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation according to table 14.2.1-2 based on indicated value X, where X is equal to the Resource reservation interval provided by higher layers divided by 100.
Each transmission of SCI format 1 is transmitted in one subframe and two physical resource blocks per slot of the subframe.
The UE shall randomly select the cyclic shift $n_{cs,\lambda}$ among $\{0, 3, 6, 9\}$ in each PSCCH transmission.

For sidelink transmission mode 4,
The UE shall determine the subframes and resource blocks for transmitting SCI format 1 as follows:
SCI format 1 is transmitted in two physical resource blocks per slot in each subframe where the corresponding PSSCH is transmitted.
If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.
If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.
the UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation field according to table 14.2.1-2 based on indicated value X, where X is equal to the Resource reservation interval provided by higher layers divided by 100.
Each transmission of SCI format 1 is transmitted in one subframe and two physical resource blocks per slot of the subframe.
The UE shall randomly select the cyclic shift $n_{cs,\lambda}$ among $\{0, 3, 6, 9\}$ in each PSCCH transmission.

Table 14.2.1-1 of 3GPP TS 36.213 V15.3.0, entitled "Mapping of DCI format 5A offset field to indicated value m", is reproduced as FIG. 7
Table 14.2.1-2 of 3GPP TS 36.213 V15.3.0, entitled "Determination of the Resource reservation field in SCI format 1", is reproduced as FIG. 8

3GPP TS 36.214 specifies some measurements for sidelink transmission as follows:

| 5.1.29 PSSCH Reference Signal Received Power (PSSCH-RSRP) | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH. The reference point for the PSSCH-RSRP shall be the antenna connector of the UE. If receiver diversity is in use by the UE, the reported value shall not be lower than the corresponding PSSCH-RSRP of any of the individual diversity branches |
| Applicable for | RRC_IDLE intra-frequency, RRC_IDLE inter-frequency, RRC_CONNECTED intra-frequency, RRC_CONNECTED inter-frequency |

3GPP TS 36.212 specifies downlink control information for the scheduling of PSCCH (Physical Sidelink Control Channel) and containing several SCI (Sidelink Control Information) format 1 fields for PSSCH (Physical Sidelink Shared Channel). The downlink control information is for communication between network node and UE, i.e. Uu link.

5.3.3.1.9A Format 5A

DCI format 5A is used for the scheduling of PSCCH, and also contains several SCI format 1 fields used for the scheduling of PSSCH.

The following information is transmitted by means of the DCI format 5A:
  Carrier indicator—3 bits. This field is present according to the definitions in [3].
  Lowest index of the subchannel allocation to the initial transmission—$\lceil \log_2(N_{subchannel}^{SL}) \rceil$ bits as defined in subclause 14.1.1.4C of [3].
  SCI format 1 fields according to 5.4.3.1.2:
    Frequency resource location of initial transmission and retransmission.
    Time gap between initial transmission and retransmission.
  SL index—2 bits as defined in subclause 14.2.1 of [3] (this field is present only for cases with TDD operation with uplink-downlink configuration 0-6).
When the format 5A CRC is scrambled with SL-SPS-V-RNTI, the following fields are present:
  SL SPS configuration index—3 bits as defined in subclause 14.2.1 of [3].
  Activation/release indication—1 bit as defined in subclause 14.2.1 of [3].
If the number of information bits in format 5A mapped onto a given search space is less than the payload size of format 0 mapped onto the same search space, zeros shall be appended to format 5A until the payload size equals that of format 0 including any padding bits appended to format 0. If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros shall be appended to format 5A until the payload size equals that of format 5A with CRC scrambled by SL-SPS-V-RNTI.

3GPP TS 36.212 also specifies CRC (Cyclic Redundancy Check) attachment for sidelink shared channel and sidelink control information. The sidelink shared channel and sidelink control information are for communication between devices, i.e. PC5 link or device-to-device link.

5.4.3.1.2 SCI Format 1

SCI format 1 is used for the scheduling of PSSCH.

The following information is transmitted by means of the SCI format 1:
  Priority—3 bits as defined in subclause 4.4.5.1 of [7].
  Resource reservation—4 bits as defined in subclause 14.2.1 of [3].
  Frequency resource location of initial transmission and retransmission—$\lceil \log_2(N_{subchannel}^{SL}(N_{subchannel}^{SL}+1)/2) \rceil$ bits as defined in subclause 14.1.1.4C of [3].
  Time gap between initial transmission and retransmission—4 bits as defined in subclause 14.1.1.4C of [3].
  Modulation and coding scheme—5 bits as defined in subclause 14.2.1 of [3].
  Retransmission index—1 bit as defined in subclause 14.2.1 of [3].
  Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.
  Reserved information bits are added until the size of SCI format 1 is equal to 32 bits. The reserved bits are set to zero.

3GPP TS 36.211 specifies generation for physical sidelink shared channel and physical sidelink control channel. The physical sidelink shared channel and physical sidelink control channel are for communication between devices, i.e. PC5 link or device-to-device link. The PSSCH delivers data or transport block for sidelink shared channel (SL-SCH). The PSCCH delivers sidelink control information (SCI).

A sidelink physical channel corresponds to a set of resource elements carrying information originating from higher layers and is the interface defined between 3GPP TS 36.212 [3] and the present document 3GPP TS 36.211. The following sidelink physical channels are defined:
  Physical Sidelink Shared Channel, PSSCH
  Physical Sidelink Control Channel, PSCCH
Generation of the baseband signal representing the different physical sidelink channels is illustrated in Figure 5.3-1.

3GPP RP-182111 specifies the Justification and objective of study item on NR V2X as follows:
  Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In the RAN1 #94 meeting, RAN1 has some agreements about NR V2X as discussed in 3GPP R1-1810051 as follows:

Agreements:
RAN1 to continue study on multiplexing physical channels considering at least the above aspects:
  Multiplexing of PSCCH and the associated PSSCH (here, the "associated" means that the PSCCH at least carries information necessary to decode the PSSCH).
    Option 1: PSCCH and the associated PSSCH are transmitted using non-overlapping time resources.
      Option 1A: The frequency resources used by the two channels are the same.
      Option 1B: The frequency resources used by the two channels can be different.
    Option 2: PSCCH and the associated PSSCH are transmitted using non-overlapping frequency resources in the all the time resources used for transmission. The time resources used by the two channels are the same.
    Option 3: A part of PSCCH and the associated PSSCH are transmitted using overlapping time resources in non-overlapping frequency resources, but another part of the associated PSSCH and/or another part of the PSCCH are transmitted using non-overlapping time resources.

[ . . . ]
Agreements:
  At least two sidelink resource allocation modes are defined for NR-V2X sidelink communication
    Mode 1: Base station schedules sidelink resource(s) to be used by UE for sidelink transmission(s)
    Mode 2: UE determines (i.e. base station does not schedule) sidelink transmission resource(s) within sidelink resources configured by base station/network or pre-configured sidelink resources
Notes:
  eNB control of NR sidelink and gNB control of LTE sidelink resources will be separately considered in corresponding agenda items.
  Mode-2 definition covers potential sidelink radio-layer functionality or resource allocation sub-modes (subject to further refinement including merging of some or all of them) where
    a) UE autonomously selects sidelink resource for transmission
    b) UE assists sidelink resource selection for other UE(s)
    c) UE is configured with NR configured grant (type-1 like) for sidelink transmission
    d) UE schedules sidelink transmissions of other UEs In the RAN1 #94bis meeting, RAN1 has some agreements about NR V2X as discussed in 3GPP R1-1812101 as follows:
Agreements:
  For unicast, sidelink HARQ feedback and HARQ combining in the physical layer are supported.
    FFS details, including the possibility of disabling HARQ in some scenarios
  For groupcast, sidelink HARQ feedback and HARQ combining in the physical layer are supported.
    FFS details, including the possibility of disabling HARQ in some scenarios
Agreements:
For PSCCH and Associated PSSCH Multiplexing
  At least one of Option 1A, 1B, and 3 is supported.
R1-1812017
Agreements:
  Sidelink control information (SCI) is defined.
    SCI is transmitted in PSCCH.
    SCI includes at least one SCI format which includes the information necessary to decode the corresponding PSSCH.
    NDI, if defined, is a part of SCI.
  Sidelink feedback control information (SFCI) is defined.
    SFCI includes at least one SFCI format which includes HARQ-ACK for the corresponding PSSCH.
Agreements:
  At least resource pool is supported for NR sidelink
    Resource pool is a set of time and frequency resources that can be used for sidelink transmission and/or reception.
    UE assumes a single numerology in using a resource pool.
    Multiple resource pools can be configured to a single UE in a given carrier.

In the RAN1 #95 meeting, RAN1 has some agreements about NR V2X as discussed in the Draft Report of 3GPP TSG RAN WG1 #95 V0.1.0 as follows:
Agreements:
  Physical sidelink feedback channel (PSFCH) is defined and it is supported to convey SFCI for unicast and groupcast via PSFCH.

In the RAN1 #AH1901 meeting, RAN1 has some agreements about NR V2X as discussed in the Draft Report of 3GPP TSG RAN WG1 #_AH 1901 V0.1.0 as follows:
Resource Pool
Agreements:
  For time domain resources of a resource pool for PSSCH,
    Support the case where the resource pool consists of non-contiguous time resources
  For frequency domain resources of a resource pool for PSSCH,
    Down select following options:
      Option 1: The resource pool always consists of contiguous PRBs
      Option 2: The resource pool can consist of non-contiguous PRBs Agreements:
  For determining the resource of PSFCH containing HARQ feedback, support that the time gap between PSSCH and the associated PSFCH is not signaled via PSCCH at least for modes 2(a)(c)(d) (if respectively supported)
Agreements:
  Sub-channel based resource allocation is supported for PSSCH
Agreement:
  SCI decoding applied during sensing procedure provides at least information on sidelink resources indicated by the UE transmitting the SCI In the RAN1 #96 meeting [16], the following agreements are reached for (V2X) sidelink transmission as discussed in the Draft Report of 3GPP TSG RAN WG1 #96 V0.1.0:

Agreements:
  Rel-16 NR sidelink supports CP-OFDM only.
Agreements:
  For the operation regarding PSSCH, a UE performs either transmission or reception in a slot on a carrier.
  NR sidelink supports for a UE:
    A case where all the symbols in a slot are available for sidelink.
    Another case where only a subset of consecutive symbols in a slot is available for sidelink
      Note: this case is not intended to be used for the ITS spectra, if there is no forward-compatibility issue. Finalize in the WI phase whether there is such an issue or not
      The subset is NOT dynamically indicated to the UE
      FFS the supported slot configuration(s)
      FFS whether/how to operate it in partial coverage scenarios
Agreements:
  At least for sidelink HARQ feedback, NR sidelink supports at least a PSFCH format which uses last symbol(s) available for sidelink in a slot.
Agreements:
  (Pre-)configuration indicates the time gap between PSFCH and the associated PSSCH for Mode 1 and Mode 2.
Agreements:
  Blind retransmissions of a TB are supported for SL by NR-V2X One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).
  Slot: A slot could be a scheduling unit in NR. A slot duration has 14 OFDM symbols.
  Mini-slot: A mini-slot is a scheduling unit with duration less than 14 OFDM symbols.
  Slot format information (SFI): A SFI is generally information of slot format of symbols in a slot. A symbol in a slot may belong to following type: downlink, uplink, unknown or other. The slot format of a slot could at least convey transmission direction of symbols in the slot.

One or multiple of following assumptions for network side may be used hereafter:
  Downlink timing of TRPs in the same cell are synchronized.
  RRC layer of network side is in BS.

One or multiple of following assumptions for UE side may be used hereafter:
  There are at least two UE (RRC) states: connected state (or called active state) and non-connected state (or called inactive state or idle state). Inactive state may be an additional state or belong to connected state or non-connected state.

In general, for LTE/LTE-A V2X and/or P2X transmission, there are two transmission modes: one is scheduled via network, such as sidelink transmission mode 3 (as discussed in 3GPP TS 36.212), and the other one is sensing-based transmission, such as sidelink transmission mode 4 (as discussed in 3GPP TS 36.212). Since the sensing-based transmission is not scheduled via network, the UE requires performing sensing before selecting a resource for transmission, in order to avoid resource collision and interference from or in other UEs. In LTE/LTE-A Release 14, a V2X resource pool is configured with one of transmission modes. Thus, the two transmission modes are not mixed utilized in a V2X resource pool. In LTE/LTE-A Release 15, the two transmission modes can be mixed utilized in a V2X resource pool. Since LTE/LTE-A V2X and/or P2X transmission mainly support broadcast transmission, HARQ feedback for sidelink transmission is not supported. It generally means that receiver device does not report HARQ feedback associated with reception of sidelink transmission to the transmitter device.

For sidelink transmission mode 3, the network node may transmit a sidelink (SL) grant, e.g. DCI format 5A in LTE/LTE-A, on Uu interface for scheduling PSCCH (Physical Sidelink Control Channel) and/or PSSCH (Physical Sidelink Shared Channel). The V2X UE may perform PSCCH and PSSCH on PC5 interface, in response to the receive DCI format 5A. Note that the V2X UE does not feedback HARQ-ACK associated with reception the DCI format 5A to network node. The Uu interface means the wireless interface for communication between network and UE. The PC5 interface means the wireless interface for communication between UEs.

A DCI (Downlink Control Information) format 5A may schedule one transmission occasion of PSCCH and/or PSSCH, wherein the DCI format 5A is with CRC scrambled via SL-V-RNTI. Alternatively, DCI format 5A may schedule semi-persistent periodic transmission occasions of PSCCH and/or PSSCH, wherein the DCI format 5A is with CRC scrambled via SL-SPS-V-RNTI. More specifically, the DCI format 5A with CRC scrambled via SL-SPS-V-RNTI may activate or release semi-persistent periodic transmission occasions of PSCCH and/or PSSCH. The periodicity may be configured in RRC with one of 20, 50, 100, 200, . . . , 1000 ms.

For one transmission occasion, the UE performs a PSSCH (new) transmission and/or a PSSCH (blind) retransmission for a transport block. For n transmission occasions, the UE performs n PSSCH (new) transmissions and/or n PSSCH (blind) retransmissions for n transport blocks.

Regarding mode 4 in LTE V2X sidelink transmission, a sidelink TX UE determines sidelink transmission resource in the (pre)-configured TX sidelink resource pool based on (previous) sensing/monitoring result(s) over periodic (sidelink) subframes. The TX UE generates the sensing or monitoring result based on sidelink control information (SCI) decoding and S-RSSI (Sidelink Received Signal Strength Indicator) measurement. In addition, the UE would exclude some candidate resource if the UE does not perform sensing or monitoring (e.g., performing sidelink transmission on a subframe among the periodic (sidelink) subframes. Based on the monitored, sensed, or received SCI from other UE(s), the UE would measure RSRP (Reference Signal Received Power) of scheduled PSSCH (Physical Sidelink Shared Channel). The UE would exclude a candidate resource if the measured RSRP of scheduled PSSCH associated to the candidate resource is larger than a threshold. In other words, larger RSRP represents the candidate resource is not available and may be occupied by other UE(s). Since LTE sidelink's traffic is periodic and predictable, it could be fine that the associated measured RSRP of scheduled PSSCH could refer to the candidate resource.

Figure 9:
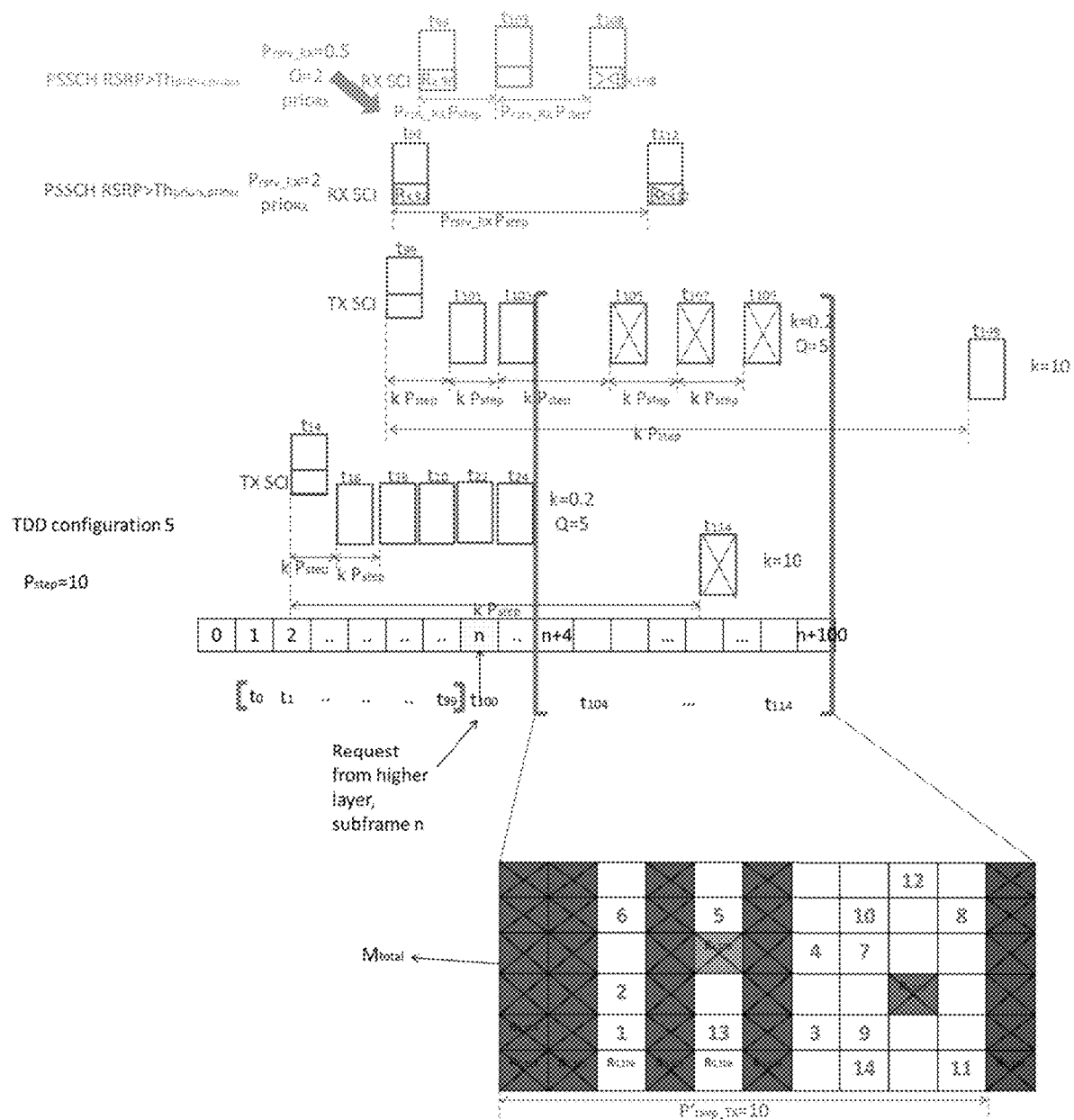
FIG. 9 is a diagram according to one exemplary embodiment.

For sensing or resource selection in mode 4 in LTE V2X sidelink, higher layer in UE side (e.g., MAC layer) would indicate a number of sub-channels. PHY layer in UE side would report a set of candidate resources, wherein a candidate resource in the set is/contains the number of sub-channels. For example, in FIG. 9, a UE is requested by higher layer and is indicated "L" number of contiguous sub-channels as a candidate resource. The PHY layer in the UE would report a set of candidate resources with length in subframe #n+4 to slot #n+100. A candidate resource for PSSCH transmission is denoted as Rx,y, wherein x is starting sub-channel index of the candidate resource. The UE would determine the set based on the sensing result from SCI transmitted by other UE(s). The number of sub-channel (e.g., "L") may determine TB size based on MCS (Modulation Coding Scheme) value. A larger TB size may require more sub-channels. The UE could select one or two resource (if the UE performs one retransmission) from the set of candidate resources. More specifically, the two resources would be used for a TB (Transport Block). In other words, TB size would be the same.

However, NR V2X supports some slots containing consecutive OFDM (Orthogonal Frequency Division Multiplexing) symbols available for sidelink (e.g., partial available, "P") could be smaller than 14 OFDM symbols and some slots containing all OFDM symbols in a slot available for sidelink (e.g., full available, "F"). Consequently, when a UE selects two resources for initial transmission and one (blind) retransmission, UE may choose F+P, wherein F is for initial transmission and P is for retransmission. In this situation, since F may contain more time resources than P, it may be hard for UE to maintain same TB size for retransmission. In addition, even UE could adjust MCS with higher modulation order, it may incur higher code rate, which may be dropped by RX UE. Since a TB with too higher code rate may be hard to be decoded successfully by RX UE. How to maintain same TB size among resource for initial transmission and resource(s) for retransmission(s) with different number of sub-channels number(s) needs to further studied. In addition, considering resource for initial sidelink transmission and resource for sidelink retransmission could contain different number of sub-channels, how to design one single SL grant indicating different number of sub-channels for initial transmission and blind retransmission(s) needs further studied (e.g., for mode-1 in NR V2X).

In one embodiment, a UE could select a first resource in a first slot for sidelink (new) transmission, wherein the first slot contains a first number of (consecutive) OFDM symbols available for sidelink. The UE could select a second resource for sidelink (re)transmission. The UE may not select sidelink resources in a second slot as the second resource, wherein the second slot contains a second number of (consecutive) OFDM symbols available for sidelink.

In one embodiment, the second number of OFDM symbols could be different from the first number of OFDM symbols. The second number of OFDM symbols could be smaller than the first number of OFDM symbols. In particular, the second number of OFDM symbols could be smaller than a number of OFDM symbols of the first number of OFDM symbols minus a symbol threshold. The second number of OFDM symbols could also be smaller than a symbol threshold, and the first number of OFDM symbols is larger than the symbol threshold.

In one embodiment, the UE would (only) select the second resource in a third slot, wherein the third slot contains a third number of (consecutive) OFDM symbols available for sidelink. The third number of OFDM symbols could be the same as the first number of OFDM symbols. The third number of OFDM symbols could be larger than or equal to the first number of OFDM symbols. In particular, the third number of OFDM symbols could be larger than or equal to than a number of OFDM symbols of the first number of OFDM symbols minus a symbol threshold. The third number of OFDM symbols could also be larger than or equal to than a symbol threshold, and the first number of OFDM symbols is larger than or equal to than the symbol threshold.

In one embodiment, the UE would (only) select the second resource in a third slot, wherein the third slot contains the same number of (consecutive) OFDM symbols available for sidelink as the first slot. In one embodiment, the first resource and the second resource could be in the same resource pool. In a resource pool, the number of (consecutive) OFDM symbols available for sidelink within one slot may be different in different slots. The resource pool may comprise sidelink resources in a carrier.

In one embodiment, the UE could select a third resource for sidelink (re)transmission. The UE may not select sidelink resources in the second slot as the third resource, wherein the second slot contains a second number of (consecutive) OFDM symbols available for sidelink.

In one embodiment, the UE would (only) select the third resource in a fourth slot, wherein the fourth slot contains a fourth number of (consecutive) OFDM symbols available for sidelink. The fourth number could be the same as the first number.

In one embodiment, if the first resource for a sidelink (initial or new) transmission for a TB is in the first slot with full available OFDM symbols for sidelink, the second resource for a sidelink retransmission for the (same) TB would be in the third slot with full available OFDM symbols for sidelink. If the first resource for a sidelink transmission for a TB is in the first slot with partial available OFDM symbols for sidelink, the second resource for a sidelink retransmission for the (same) TB would be in the third slot with partial available OFDM symbols for sidelink.

In one embodiment, if the first resource for a sidelink (initial or new) transmission for a TB is in the first slot with (partial) available OFDM symbols for sidelink being larger than or equal to than a symbol threshold, the second resource for a sidelink retransmission for the (same) TB would be in the third slot with (partial) available OFDM symbols for sidelink being larger than or equal to than the symbol threshold. If the first resource for a sidelink transmission for a TB is in the first slot with (partial) available OFDM symbols for sidelink being smaller than a symbol threshold, the second resource for a sidelink retransmission for the (same) TB would be in the third slot with (partial) available OFDM symbols for sidelink being smaller than the symbol threshold.

In one embodiment, the UE could be configured with a carrier, wherein a slot in the carrier contains all OFDM symbols or a subset of OFDM symbols available for sidelink transmission. The UE could be configured with a first (sidelink) resource pool in the carrier. The UE could also be configured with a second (sidelink) resource pool in the carrier. Furthermore, the UE could be configured with a third (sidelink) resource pool in the carrier.

In one embodiment, the first (sidelink) resource pool (only) comprises resources in slots with same number of consecutive OFDM symbols available for sidelink as the first slot. The second (sidelink) resource pool comprises resources in slots, wherein a slot among the slots contains different number of consecutive OFDM symbols available for sidelink compared to the first slot. The third (sidelink) resource pool comprises resources in slots, wherein some slots among the slots contain different number of consecutive OFDM symbols available for sidelink compared to the first slot and some slots among the slots contain same number of consecutive OFDM symbols available for sidelink compared to the first slot.

In one embodiment, the UE could perform resource selection among a plurality of slot(s) on the carrier, wherein the plurality of slot(s) comprises the first slot, the second slot, and/or the third slot. The plurality of slot(s) could be in the first (sidelink) resource pool, the second (sidelink) resource pool, the third (sidelink) resource pool, or the fourth (sidelink) resource pool. The first resource, the second resource, and/or the third resource could be for a (same) TB.

In one embodiment, the UE could be configured with the first number of (consecutive) OFDM symbols available for sidelink in the first slot, the second number of (consecutive) OFDM symbols available for sidelink in the second slot, the third number of (consecutive) OFDM symbols available for sidelink in the third slot, or the fourth number of (consecutive) OFDM symbols available for sidelink in the fourth slot.

In one embodiment, the first number could be the same as the third number. The first slot could be a reference slot. The first number could also be 14.

In one embodiment, the second number could be different from the third number. The second number could be less than 14.

In one embodiment, the first number could be equal to total number of OFDM symbols in a slot. The first slot may comprise 14 OFDM symbols.

In one embodiment, the first number could be larger than or equal to a symbol threshold, e.g. 10. The second number may be smaller than the symbol threshold, e.g. 10. The third number could be larger than or equal to the symbol threshold, e.g. 10.

In one embodiment, when the UE selects the second resource, the UE could exclude the first resource, a resource in the first slot, and/or a resource in the second slot. When the UE selects the third resource, the UE could exclude the first resource and the second resource, a resource in the first slot, a resource in the second slot, and/or a resource in the third slot.

In one embodiment, the UE would be indicated with a first number of (contiguous) sub-channels. The UE may derive a TB size at least based on the first number of (contiguous) sub-channels and the first number of OFDM symbols. Furthermore, the UE may derive a code rate of the TB size on a candidate resource in the second slot, wherein the resource comprises the first number of (contiguous) sub-channels and the second number of OFDM symbols.

In one embodiment, when the UE selects the second resource, the UE could exclude a resource in the second slot, wherein code rate of a TB transmitted on the resource is larger than a threshold. Furthermore, when the UE selects the second resource, the UE could exclude the second slot, wherein code rate of a TB transmitted on the resource is larger than a threshold. The threshold could be 0.92. The threshold could be fixed or (pre-)configured.

In one embodiment, if the first number and the third number are smaller than 14, the third number could be different from the first number. In other words, the UE would select the first resource on a slot with partial (consecutive) available OFDM symbols for sidelink, and select the second resource on a slot with partial (consecutive) available OFDM symbols for sidelink.

Figure 10:
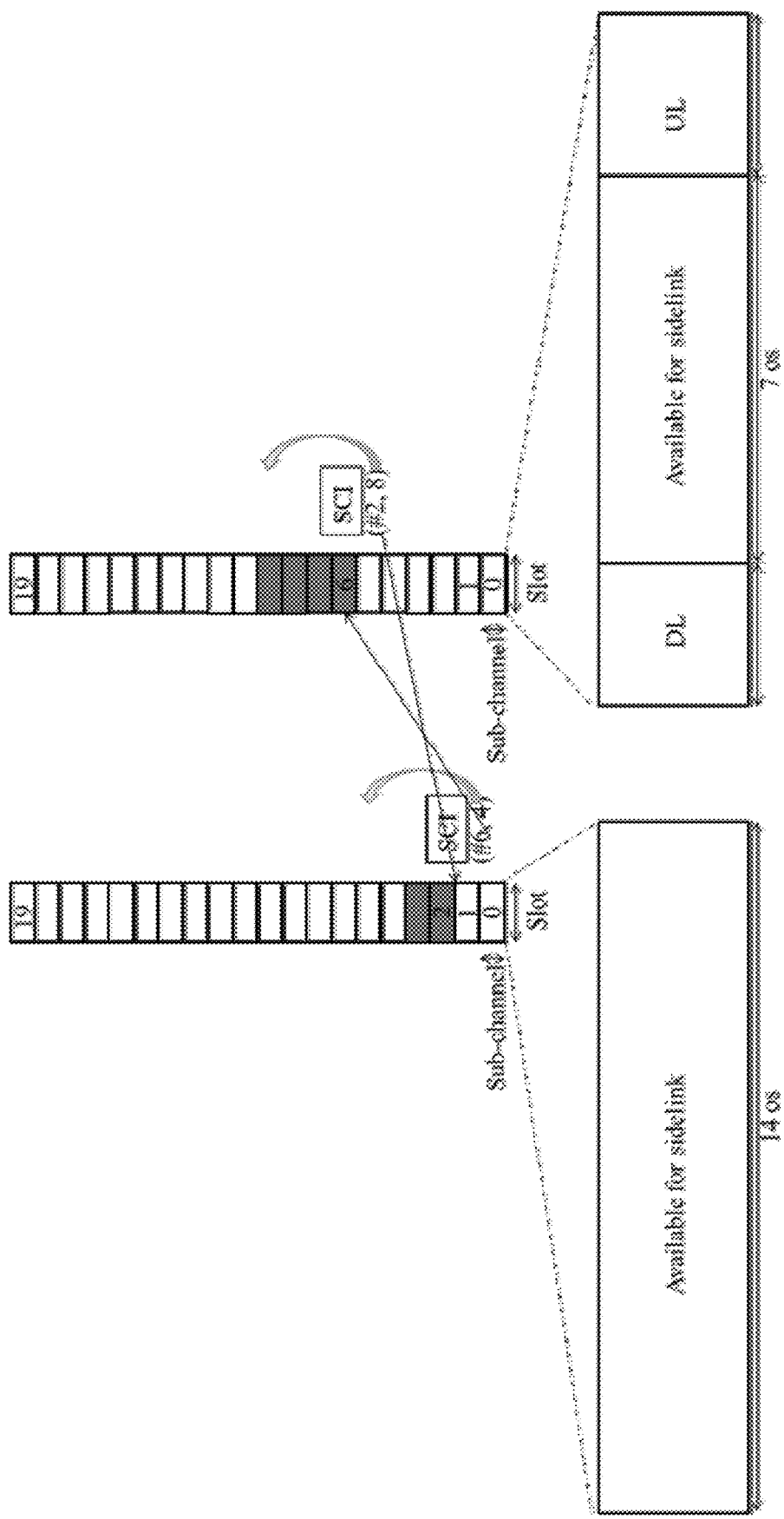
FIG. 10 is a diagram according to one exemplary embodiment.

For example, as shown in FIG. 10, the UE is indicated with a number of contiguous sub-channels (e.g., 2 sub-channels). The UE would select a first resource and a second resource among slot n+4 to slot n+20. In one embodiment, the first resource and/or the second resource contain 2 sub-channels. A sub-channel may contain a number of (contiguous) PRB (e.g., 4 PRBs for a sub-channels). In this example, if the UE selects the first resource in a slot with same number of (consecutive) available sidelink OFDM symbols as slot #m (e.g., 14 (consecutive) OFDM symbols are available for sidelink), the UE would exclude a resource in a slot for selecting the second resource, wherein the slot contains different (consecutive) number of available sidelink OFDM symbols from slot #m (e.g., a resource and/or all resource in slot n+4 would be excluded by the UE). The UE selects a resource on a slot for selecting the second resource, wherein the slot contains the same (consecutive) number of available sidelink OFDM symbols as the slot #m.

In one embodiment, if the UE performs one sidelink transmission (e.g., one (new or initial) sidelink transmission), the UE may not select the second resource. If the UE performs at least two sidelink transmissions (e.g., one (new or initial) sidelink transmission and one or more than one sidelink retransmission), the UE may select the first resource and at least one second resource.

In one embodiment, if the first slot is earlier than the third slot, the UE could transmit a (new or initial) sidelink transmission on the first resource. The UE could also transmit a sidelink retransmission on the second resource.

In one embodiment, if the first slot is later than the third slot, the UE could transmit a (new or initial) sidelink transmission on the second resource. The UE could also transmit a sidelink retransmission on the first resource.

In one embodiment, if the UE would perform sidelink transmission for a TB three times, the UE could determine the earliest resource among the first resource, the second resource, and the third resource should be used for the initial sidelink transmission of a TB, and that the remaining two resources should be used for the sidelink retransmission of the TB.

In one embodiment, the first slot may not be the same slot as the second slot. Furthermore, the first slot may not be the same slot as the third slot.

In one embodiment, the fourth slot may not be the same slot as the first slot. Furthermore, the fourth slot may not be the same slot as the third slot.

In one embodiment, the first resource in time domain could contain or occupy the first number of OFDM symbols. The first resource in time domain could also contain or occupy (the first number of OFDM symbols minus a fifth number of OFDM symbols. The fifth number of OFDM symbols could be among the first number of OFDM symbols. The fifth number of OFDM symbols could contain sidelink available OFDM symbols not for sidelink data and/or control transmission in the first slot. The fifth number of OFDM symbols could contain OFDM symbols for any of feedback channel, TX/RX transition time, and/or AGC (Automatic Gain Control) time, in the first slot.

In one embodiment, the second resource in time domain would contain/occupy the third number of OFDM symbols. In one embodiment, the second resource in time domain may contain or occupy (the third number of OFDM symbols minus a sixth number of OFDM symbols. The sixth number of OFDM symbols could be among the third number of OFDM symbols. The sixth number of OFDM symbols may contain sidelink available OFDM symbols not for sidelink data and/or control transmission in the third slot. The sixth number of OFDM symbols may contain OFDM symbols for any of feedback channel, TX/RX transition time, and/or AGC time, in the third slot.

In one embodiment, the first resource in frequency domain may contain the first number of sub-channel(s). The second resource in frequency domain may contain the first number of sub-channel(s).

In one embodiment, the second resource in frequency domain may contain a second number of sub-channel(s), wherein the second number of sub-channel(s) is different from the first number of sub-channel(s). The second number of sub-channel(s) could be determined based on the first number of sub-channel(s) and/or the first number of OFDM symbols and/or the third number of OFDM symbols.

In one embodiment, the UE could be in autonomous resource selection mode (e.g., LTE V2X mode-4, and/or NR V2X mode-2).

In one embodiment, a network could select a first resource in a first slot for sidelink (new) transmission, wherein the first slot contains a first number of (consecutive) OFDM symbols available for sidelink. The network could select a second resource for sidelink (re)transmission. The network may not select the resources in a second slot as the second resource, wherein the second slot contains a second number of (consecutive) OFDM symbols available for sidelink. The network may not be allowed to select the second resource in a second slot, wherein the second slot contains a second number of (consecutive) OFDM symbols available for sidelink.

In one embodiment, the second number of OFDM symbols could be different from the first number of OFDM symbols. The second number of OFDM symbols could be smaller than the first number of OFDM symbols. The second number of OFDM symbols could also be smaller than a number of OFDM symbols of the first number of OFDM symbols minus a symbol threshold. Furthermore, the second number of OFDM symbols could be smaller than a symbol threshold, and the first number of OFDM symbols is larger than the symbol threshold.

The network could only or shall select the second resource in a third slot, wherein the third slot contains a third number of (consecutive) OFDM symbols available for sidelink. In one embodiment, the third number of OFDM symbols could be the same as the first number of OFDM symbols. The third number of OFDM symbols could be larger than or equal to the first number of OFDM symbols. In particular, the third number of OFDM symbols could be larger than or equal to than a number of OFDM symbols of the first number of OFDM symbols minus a symbol threshold. The third number of OFDM symbols could also be larger than or equal to than a symbol threshold, and the first number of OFDM symbols is larger than or equal to than the symbol threshold.

The network could only or shall select the second resource in a third slot, wherein the third slot contains the same number of (consecutive) OFDM symbols available for sidelink as the first slot. The network could transmit a DCI to a UE, wherein the DCI indicates the first resource and the second resource for sidelink transmission. In one embodiment, in a resource pool, the number of (consecutive) OFDM symbols available for sidelink within one slot may be different in different slots. The resource pool may comprise sidelink resources in a carrier.

In one embodiment, the network could configure the UE with a carrier, wherein a slot in the carrier contains all OFDM symbols or a subset of OFDM symbols available for sidelink transmission. The network could configure the UE with a first (sidelink) resource pool in the carrier, a second (sidelink) resource pool in the carrier, and/or a third (sidelink) resource pool in the carrier.

In one embodiment, the first (sidelink) resource pool (only) comprises resources in slots with same number of consecutive OFDM symbols available for sidelink as the first slot. The second (sidelink) resource pool comprises resources in slots, wherein a slot among the slots contains different number of consecutive OFDM symbols available for sidelink compared to the first slot. The third (sidelink) resource pool comprises resources in slots, wherein some slots among the slots contain different number of consecutive OFDM symbols available for sidelink compared to the first slot and some slots among the slots contain same number of consecutive OFDM symbols available for sidelink compared to the first slot.

In one embodiment, the first resource and the second resource may be in the same resource pool (e.g., the first resource pool or the second resource pool or the third resource pool).

In one embodiment, the network could perform resource selection among a plurality of slot(s) on the carrier, wherein the plurality of slot(s) comprises the first slot and/or the second slot and/or the third slot. The plurality of slot(s) could be in the first (sidelink) resource pool, the second (sidelink) resource pool, or the third (sidelink) resource pool. The first resource and/or the second resource could be for a (same) TB.

In one embodiment, the network could configure the UE with the first number of (consecutive) OFDM symbols available for sidelink in the first slot, the second number of (consecutive) OFDM symbols available for sidelink in the second slot, and/or the third number of (consecutive) OFDM symbols available for sidelink in the third slot.

In one embodiment, the first number could be the same as the third number. The first slot could be a reference slot. The first number could be 14.

In one embodiment, the second number could be different from the third number.

The second number could be less than 14.

In one embodiment, the first number could be equal to total number of OFDM symbols in a slot. The first slot may comprise 14 OFDM symbols.

In one embodiment, the first number could be larger than or equal to a symbol threshold, e.g. 10. The second number may be smaller than the symbol threshold, e.g. 10. The third number could be larger than or equal to the symbol threshold, e.g. 10.

In one embodiment, when the network selects the second resource, the network could exclude the first resource, a resource in the first slot, and/or a resource in the second slot.

In one embodiment, the network could select the first resource based on a first number of (contiguous) sub-channels. The network may derive a TB size at least based on the first number of (contiguous) sub-channels and the first number of OFDM symbols. The network may derive a code rate of the TB size on a resource in the second slot, wherein the resource comprises the first number of (contiguous) sub-channels and the second number of OFDM symbols.

In one embodiment, when the network selects the second resource, the network could exclude a candidate resource in the second slot, wherein code rate of a TB transmitted on the resource is larger than a threshold. Furthermore, when the network selects the second resource, the network could exclude the second slot, wherein code rate of a TB transmitted on the resource is larger than a threshold. The threshold could be 0.92. The threshold could be fixed or (pre-)configured.

In one embodiment, if the first number and the third number are smaller than 14, the third number could be different from the first number. In other words, the network could select the first resource on a slot with partial (consecutive) available OFDM symbols for sidelink, and could select the second resource on a slot with partial (consecutive) available OFDM symbols for sidelink.

In one embodiment, if the first slot is earlier than the third slot, the UE could transmit a (new or initial) sidelink transmission on the first resource. The UE could also transmit a sidelink retransmission on the second resource.

In one embodiment, if the first slot is later than the third slot, the UE could transmit a (new or initial) sidelink transmission on the second resource. The UE could also transmit a sidelink retransmission on the first resource.

In one embodiment, the first slot may not be the same slot as the second slot. Furthermore, the first slot may not be the same slot as the third slot.

In one embodiment, the first resource in time domain could contain or occupy the first number of OFDM symbols. The first resource in time domain could also contain or occupy (the first number of OFDM symbols minus a fourth number of OFDM symbols. The fourth number of OFDM symbols could be among the first number of OFDM symbols. The fourth number of OFDM symbols could contain sidelink available OFDM symbols not for sidelink data and/or control transmission in the first slot. The fourth number of OFDM symbols could also contain OFDM symbols for any of feedback channel, TX/RX transition time, and/or AGC time, in the first slot.

In one embodiment, the second resource in time domain could contain or occupy the third number of OFDM symbols. The second resource in time domain could also contain or occupy (the third number of OFDM symbols minus a fifth number of OFDM symbols.

In one embodiment, the fifth number of OFDM symbols could be among the third number of OFDM symbols. The fifth number of OFDM symbols could contain sidelink available OFDM symbols not for sidelink data and/or control transmission in the third slot. The fifth number of OFDM symbols could also contain OFDM symbols for any of feedback channel, TX/RX transition time, and/or AGC time, in the third slot.

In one embodiment, the first resource in frequency domain may contain the first number of sub-channel(s). The second resource in frequency domain may contain the first number of sub-channel(s). The second resource in frequency domain may also contain a second number of sub-channel(s), wherein the second number of sub-channel(s) is different from the first number of sub-channel(s). The second number of sub-channel(s) could be determined based on the first number of sub-channel(s) and/or the first number of OFDM symbols and/or the third number of OFDM symbols.

In one embodiment, a UE could be in network scheduling mode (e.g., LTE V2X mode-3, and/or NR V2X mode-1)

In general, the first concept is that a UE is configured with a carrier or a resource pool that comprises at least a slot with full available OFDM symbols for sidelink and at least a slot with partial available OFDM symbols for sidelink. In one embodiment, the UE could be allowed to choose a first resource for a sidelink transmission for a TB and a second resource for other sidelink transmission for the TB, wherein the first resource and the second resource contain different number of OFDM symbols. Alternatively, a UE could be configured with a carrier or a resource pool that comprises different partial available OFDM symbols for sidelink in different slots. More specifically, the UE could be configured with a carrier or a resource pool that comprises at least a slot with available OFDM symbols for sidelink being larger than or equal to a symbol threshold and at least a slot with available OFDM symbols for sidelink being smaller than the symbol threshold.

In one embodiment, the UE could be allowed to choose a first resource for a sidelink transmission for a TB and a second resource for other sidelink transmission for the TB, wherein the first resource and the second resource contain different number of OFDM symbols. More specifically, the first resource may contain OFDM symbols for sidelink being larger than or equal to the symbol threshold, and the second resource may contain OFDM symbols for sidelink being smaller than the symbol threshold.

In one embodiment, the UE could maintain (same) TB size for transmitting on the first resource and transmitting on the second resource. The first resource and the second resource could be in the same resource pool. The resource pool may comprise resources in a carrier.

In one embodiment, the UE could select the first resource in a first slot for sidelink (new) transmission, wherein the first slot contains a first number of (consecutive) OFDM symbols available for sidelink. The UE could also select a second resource for sidelink (re)transmission. Furthermore, the UE could select the second resource in a second slot, wherein the second slot contains a second number of (consecutive) OFDM symbols available for sidelink.

In one embodiment, the second number could be different from the first number. Alternatively, the second number could be the same as the first number. The second number could also be smaller than the first number. The first number could be larger than or equal to the symbol threshold, and the second number could be smaller than the symbol threshold.

In one embodiment, the UE could be configured with a carrier, wherein a slot in the carrier contains all OFDM symbols or a subset of OFDM symbols available for sidelink transmission. The UE could be configured with a first (sidelink) resource pool in the carrier, a second (sidelink) resource pool in the carrier, or a third (sidelink) resource pool in the carrier.

In one embodiment, the first (sidelink) resource pool (only) comprises resources in slots with same number of consecutive OFDM symbols available for sidelink as the first slot. The second (sidelink) resource pool comprises resources in slots, wherein a slot among the slots contains different number of consecutive OFDM symbols available for sidelink compared to the first slot. The third (sidelink) resource pool comprises resources in slots, wherein some slots among the slots contain different number of consecutive OFDM symbols available for sidelink compared to the first slot and some slots among the slots contain same number of consecutive OFDM symbols available for sidelink compared to the first slot.

In one embodiment, the UE could perform resource selection among a plurality of slot(s) on the carrier, wherein the plurality of slot(s) comprises the first slot and/or the second slot. The plurality of slot(s) could be in the first (sidelink) resource pool, the second (sidelink) resource pool, or the third (sidelink) resource pool.

In one embodiment, the first resource and/or the second resource could be for a (same) TB.

In one embodiment, the UE could be configured with the first number of (consecutive) OFDM symbols available for sidelink in the first slot, or with the second number of (consecutive) OFDM symbols available for sidelink in the second slot. In one embodiment, the first slot could be a reference slot. The first number could be 14, and the second number could be less than 14. The first number could be equal to total number of OFDM symbols in a slot.

In one embodiment, the first slot may comprise 14 OFDM symbols. The first number could be larger than or equal to a symbol threshold, e.g. 10. The second number may be smaller than the symbol threshold, e.g. 10.

In one embodiment, the UE could be given a first number of sub-channel(s). The UE may select the first resource based on the first number of sub-channel(s). After the UE selects the first resource first, the UE may select the second resource. The UE may derive a TB size at least based on the first number of (contiguous) sub-channels and the first number of OFDM symbols. The UE may also derive a TB size based on the first resource.

In one embodiment, the UE could apply a first MCS based on at least the first code rate and/or the first resource for the TB. The UE may derive a TB size at least based on the first number of (contiguous) sub-channels and the first number of OFDM symbols, and a first MCS. The UE may derive a first code rate of the TB size based on the first MCS and/or the first resource.

In one embodiment, when the UE selects the second resource in the second slot (e.g., with different number of consecutive OFDM symbols for sidelink compared to the first slot), wherein the second number of consecutive OFDM symbols available for sidelink is smaller than the first number of consecutive OFDM symbols available for sidelink,
  the UE could select the second resource with more frequency resource, and/or
  the UE could select the second resource with a second number of (contiguous) sub-channels, wherein the second number of (contiguous) sub-channels is larger than the first number of (contiguous) sub-channels, and/or
  the UE could select the second resource with the first number of (contiguous) sub-channels, wherein a sub-channel in the second slot comprises more PRBs than a sub-channel in the first slot, and/or
  the UE could maintain or apply the same first MCS value of the TB on the second resource, and/or
  the UE could maintain or apply the same first code rate of the TB on the second resource.

In one embodiment, when the UE selects the second resource in the second slot (e.g., with different number of consecutive OFDM symbols for sidelink compared to the first slot), wherein the second number of consecutive OFDM symbols available for sidelink is larger than the first number of consecutive OFDM symbols available for sidelink,
  the UE could select the second resource with less frequency resource, and/or
  the UE could select the second resource with a second number of (contiguous) sub-channels, wherein the second number of (contiguous) sub-channels is smaller than the first number of (contiguous), and/or
  the UE could select the second resource with the first number of (contiguous) sub-channels, wherein a sub-channel in the second slot comprises less PRBs than a sub-channel in the first slot, and/or
  the UE could maintain or apply the same first MCS value of the TB on the second resource, and/or
  the UE could maintain or apply the same first code rate of the TB on the second resource.

In one embodiment, the UE could apply a second MCS based on at least the first code rate and/or the second resource for the TB. The UE may derive a second code rate of the TB size on a candidate resource in the second slot, wherein the resource comprises the first number of (contiguous) sub-channels and the second number of OFDM symbols.

In one embodiment, when the UE selects the second resource in the second slot (e.g., with different number of consecutive OFDM symbols for sidelink compared to the first slot), wherein the second resource comprises the first number of (contiguous) sub-channels (e.g., same frequency resource as the first resource), and wherein the second number of consecutive OFDM symbols available for sidelink is smaller than the first number of consecutive OFDM symbols available for sidelink,
  the UE could apply a second MCS value of the TB on the second resource, and/or
  the UE could apply a second code rate of the TB on the second resource, and/or
  the UE could apply the first MCS value for part of the TB (e.g., code block group, (CBG)) transmitted on the second resource, and/or
  the UE could apply the first code rate for part of the TB transmitted on the second resource, and/or
  the UE could transmit part of the TB on the second resource, and/or
  the UE could transmit a first number of CBG on the second resource, wherein the TB comprises a second number of CBG, and the first number is smaller than the second number.

In one embodiment, the first code rate may be lower than or equal to the second code rate. The second number of (contiguous) sub-channels could be determined, derived, or generated based on the second number of consecutive OFDM symbols available for sidelink. The second number of (contiguous) sub-channels could be determined, derived, or generated based on a ratio and/or the first number of (contiguous) sub-channels.

Alternatively, the ratio could be derived as ceil(number of OFDM symbols available for sidelink transmission in the first slot (numerator)/number of OFDM symbols available for sidelink transmission in the second slot (denominator)). The ratio could also be derived as ceil(14(numerator)/number of OFDM symbols available for sidelink transmission in the second slot (denominator)). Furthermore, the ratio may be fixed, (pre-)configured, or specified.

In one embodiment, the second number of (contiguous) sub-channels could be the ratio*the first number of (contiguous) sub-channels). If the UE would perform one sidelink transmission (e.g., one (new/initial) sidelink transmission), the UE may not select the second resource.

In one embodiment, if the UE performs at least two sidelink transmission (e.g., one (new/initial) sidelink transmission and one or more than one sidelink retransmission), the UE could select the first resource and at least one second resource. If the first slot is earlier than the second slot, the UE may transmit a (new/initial) sidelink transmission on the first resource. The UE may also transmit a sidelink retransmission on the second resource.

If the first slot is later than the second slot, the UE may transmit a (new/initial) sidelink transmission on the second resource. The UE may transmit a sidelink retransmission on the first resource. The first slot may not be the same slot as the second slot. The first resource in time domain could contain or occupy the first number of OFDM symbols. The first resource in time domain could also contain or occupy (the first number of OFDM symbols minus a fourth number of OFDM symbols).

In one embodiment, the fourth number of OFDM symbols could be among the first number of OFDM symbols. The fourth number of OFDM symbols may contain sidelink available OFDM symbols not for sidelink data and/or control transmission in the first slot. The fourth number of OFDM symbols may also contain OFDM symbols for any of feedback channel, TX/RX transition time, and/or AGC time, in the first slot.

In one embodiment, the second resource in time domain may contain or occupy the second number of OFDM symbols. The second resource in time domain may contain or occupy (the second number of OFDM symbols minus a fifth number of OFDM symbols).

In one embodiment, the fifth number of OFDM symbols could be among the second number of OFDM symbols. The fifth number of OFDM symbols could contain sidelink available OFDM symbols not for sidelink data and/or control transmission in the second slot. The fifth number of OFDM symbols could contain OFDM symbols for any of feedback channel, TX/RX transition time, and/or AGC time, in the second slot.

In one embodiment, the first resource in frequency domain may contain the first number of sub-channel(s). The second resource in frequency domain may contain the first number of sub-channel(s). The second resource in frequency domain may contain a second number of sub-channel(s), wherein the second number of sub-channel(s) is different from the first number of sub-channel(s).

In one embodiment, the second number of sub-channel(s) could be determined based on the first number of sub-channel(s) and/or the first number of OFDM symbols and/or the second number of OFDM symbols. A UE could be in autonomous resource selection mode (e.g., LTE V2X mode-4, and/or NR V2X mode-2)

For example, as shown in FIG. 10, a UE is given 2 consecutive sub-channels for resource selection. In one embodiment, the UE could select a first resource with 2 consecutive sub-channels for a sidelink transmission of a TB in a first slot with 14 OFDM symbols available for sidelink.

After the UE selects the first resource, the UE could select a second resource for other sidelink transmission of the TB. If a candidate resource for the second resource is in a second slot with 7 OFDM symbols available for sidelink, the UE could select the second resource with 4 sub-channels. In other words, the UE could determine or derive frequency resource of the second resource based on number of consecutive OFDM symbols available for sidelink in a candidate slot. In this example, the first resource and the second resource are illustrated as shown in FIG. 10.

The UE could transmit a first SCI in the first resource. The UE could transmit a second SCI in the second resource. In one embodiment, the first SCI could indicate a first starting sub-channel position or index and a first length of sub-channel. The second SCI could indicate a second starting sub-channel position or index and a second length of sub-channel. In one embodiment, the first length could indicate frequency resource or range of the first resource. The second length could indicate frequency resource or range of the second resource. The first starting sub-channel position or index could indicate starting sub-channel position or index of the second resource. In one embodiment, the second starting sub-channel position or index could indicate starting sub-channel position or index of the first resource. A second UE (e.g., RX UE) could determine the starting sub-channel position or index of the first resource based on the sub-channel where the second UE receives the first SCI and/or the second SCI.

In one embodiment, frequency assignment in a SCI could indicate a RIV (Resource Indication Value) value, wherein a stating sub-channel position or index and length of sub-channels would be derived based on the RIV value. Size of frequency assignment in a first SCI could be derived based on number of OFDM symbols available for sidelink in the first slot. Size of frequency assignment in the first SCI could be ceil(log 2(20*(20+1)/2)). Furthermore, size of frequency assignment in a second SCI could be derived based on number of OFDM symbols available for sidelink in the second slot. Size of frequency assignment in the second SCI could be ceil(log 2(20*(20+1)/2)).

Figure 11:
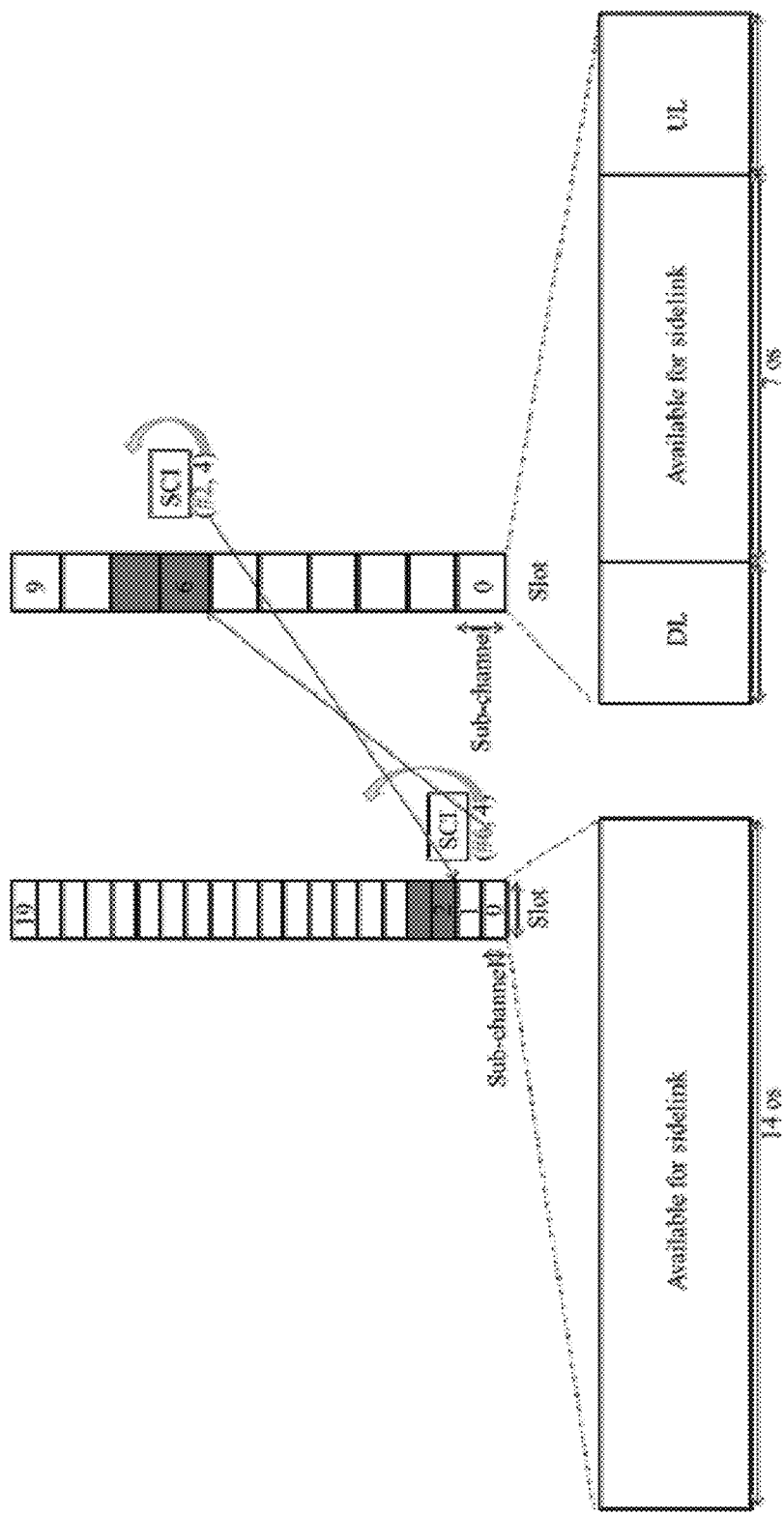
FIG. 11 is a diagram according to one exemplary embodiment.

As another example, as shown in FIG. 11, a UE is given 2 consecutive sub-channels for resource selection. In one embodiment, the UE could select a first resource with 2 consecutive sub-channels for a sidelink transmission of a TB in a first slot with 14 OFDM symbols available for sidelink. After the UE selects the first resource, the UE could select a second resource for other sidelink transmission of the TB. If a candidate resource for the second resource is in a second slot with 7 OFDM symbols available for sidelink, the UE could select the second resource with 2 sub-channels.

In one embodiment, a sub-channel in the second slot may comprise 2 time PRBs than the first slot. In other words, the UE could determine or derive frequency resource of the second resource based granularity of one sub-channel in the second slot. Granularity of a sub-channel in the second slot could be determined based on the ratio of the number of consecutive OFDM symbols available for sidelink in the first slot (e.g., the first slot could be a reference slot comprising 14 OFDM symbols available for sidelink) to the number of consecutive OFDM symbols available for sidelink in the second slot.

The UE could transmit a first SCI in the first resource. The UE could transmit a second SCI in the second resource. In one embodiment, the first SCI could indicate a first starting sub-channel position/index and a first length of sub-channel. The second SCI could indicate a second starting sub-channel position or index and a second length of sub-channel. In one embodiment, the first length could indicate frequency resource or range of the first resource. The second length could indicate frequency resource or range of the second resource.

In one embodiment, frequency assignment in a SCI could indicate a RIV value, wherein a stating sub-channel position or index and length of sub-channels could be derived based on the RIV value. Size of frequency assignment in a first SCI could be derived based on number of OFDM symbols available for sidelink in the first slot. Size of frequency assignment in the first SCI could be ceil(log 2(20*(20+1)/2)). Size of frequency assignment in a second SCI could be derived based on number of OFDM symbols available for sidelink in the second slot. Size of frequency assignment in the second SCI could be ceil(log 2(20*(20+1)/2)). Alternatively, size of frequency assignment in the second SCI could be ceil(log 2(10*(10+1)/2)).

In one embodiment, size of frequency assignment in the second SCI could also be derived from number of sub-channels in a reference slot. A reference slot could be a slot containing a number of (consecutive) OFDM symbols available for sidelink. The number of consecutive OFDM symbols available for sidelink could be a reference number for deriving TB size. The reference number could be derived based on the amount of symbols for sidelink data transmission in the first slot and the amount of symbols for sidelink data transmission in the second slot. The reference number could be derived based on the first number of OFDM symbols and/or the fourth number of symbols. The reference number could be derived based on the first number of OFDM symbols excluding the fourth number of symbols. The reference slot could be a slot containing 14 OFDM symbols for sidelink. The reference slot could also be a slot among slots in a sidelink resource pool, wherein the slot contains most number of sub-channels.

In general, the second concept is that a network configures a UE with a carrier or a resource pool that comprises at least a slot with full available OFDM symbols for sidelink and at least a slot with partial available OFDM symbols for sidelink. In one embodiment, the network could transmit SL grant in Uu interface to the UE for scheduling sidelink transmission. The SL grant could be indicated by a DCI. The UE could perform sidelink transmission based on the SL grant.

In one embodiment, the network could be allowed to schedule a first resource for a sidelink transmission for a TB and a second resource for other sidelink transmission for the TB, wherein the first resource and the second resource contain different number of OFDM symbols. The network could configure a UE with a carrier or a resource pool that comprises different partial available OFDM symbols for sidelink in different slots. More specifically, the network could configure a UE with a carrier or a resource pool that comprises at least a slot with available OFDM symbols for sidelink being larger than or equal to a symbol threshold and at least a slot with available OFDM symbols for sidelink being smaller than the symbol threshold.

In one embodiment, the network could be allowed to schedule a first resource for a sidelink transmission for a TB and a second resource for other sidelink transmission for the TB, wherein the first resource and the second resource contain different number of OFDM symbols. More specifically, the first resource may contain OFDM symbols for sidelink being larger than or equal to the symbol threshold, and the second resource contains OFDM symbols for sidelink being smaller than the symbol threshold.

In one embodiment, the UE could transmit the sidelink transmission for the TB on the first resource. The UE could also transmit the other sidelink transmission for the TB on the second resource.

In one embodiment, the network could maintain (same) TB size when selecting or determining the first resource and the second resource. The first resource and the second resource could be in the same resource pool. The resource pool may comprise resources in a carrier.

In one embodiment, the network could select the first resource in a first slot for sidelink (new) transmission, wherein the first slot contains a first number of (consecutive) OFDM symbols available for sidelink. The network could also select a second resource, wherein the UE would perform sidelink (re)transmission on the second resource. In particular, the network could select the second resource in a second slot, wherein the second slot contains a second number of (consecutive) OFDM symbols available for sidelink.

In one embodiment, the second number could be different from the first number. Alternatively, the second number could be the same as the first number. The second number could also be smaller than the first number. The first number could be larger than or equal to the symbol threshold, and the second number could be smaller than the symbol threshold.

In one embodiment, the network could configure the UE with a carrier, wherein a slot in the carrier contains all OFDM symbols or a subset of OFDM symbols available for sidelink transmission. The network could configure the UE with a first (sidelink) resource pool in the carrier, a second (sidelink) resource pool in the carrier, or a third (sidelink) resource pool in the carrier. The first (sidelink) resource pool (only) comprises resources in slots with same number of consecutive OFDM symbols available for sidelink as the first slot. The second (sidelink) resource pool comprises resources in slots, wherein a slot among the slots contains different number of consecutive OFDM symbols available for sidelink compared to the first slot. The third (sidelink) resource pool comprises resources in slots, wherein some slots among the slots contain different number of consecutive OFDM symbols available for sidelink compared to the first slot and some slots among the slots contain same number of consecutive OFDM symbols available for sidelink compared to the first slot.

In one embodiment, the network could perform resource selection among a plurality of slot(s) on the carrier, wherein the plurality of slot(s) comprises the first slot and/or the second slot. The plurality of slot(s) could be in the first (sidelink) resource pool, the second (sidelink) resource pool, or the third (sidelink) resource pool. The first resource and/or the second resource could be for a (same) TB.

In one embodiment, the network could configure the UE with the first number of (consecutive) OFDM symbols available for sidelink in the first slot. The network could also configure the UE with the second number of (consecutive) OFDM symbols available for sidelink in the second slot. The first slot could be a reference slot. The first number could be 14, and the second number could be less than 14.

In one embodiment, the first number could be equal to total number of OFDM symbols in a slot. The first slot may comprise 14 OFDM symbols. The first number could be larger than or equal to a symbol threshold, e.g. 10. The second number may be smaller than the symbol threshold, e.g. 10.

In one embodiment, the UE could report a first MCS value and/or TB size of the TB to the network. The UE may not expect to receive the SL grant indicating the first resource and the second resource such that code rate of the first resource or code rate of the second resource based on the first MCS and the TB size of the TB would exceed a threshold.

In one embodiment, the network could select the first resource based on the first MCS and the TB size. Alternatively, the network could select the first resource based on a first number of sub-channel(s). After the network selects the first resource first, the network may select the second resource.

In one embodiment, the UE may derive a TB size at least based on the first number of (contiguous) sub-channels and the first number of OFDM symbols. The UE may also derive a TB size based on the first resource.

In one embodiment, the UE could apply a first MCS based on at least the first code rate and/or the first resource for the TB. The UE may derive a TB size at least based on the first number of (contiguous) sub-channels and the first number of OFDM symbols, and a first MCS. The UE may derive a first code rate of the TB size based on the first MCS and/or the first resource.

In one embodiment, if the network selects the first resource in the first slot and the second resource in the second slot, (e.g., with different number of consecutive OFDM symbols for sidelink between the first slot and the second slot), wherein the second number of consecutive OFDM symbols available for sidelink is smaller than the first number of consecutive OFDM symbols available for sidelink,
the network could select the second resource with more frequency resource, and/or
the network could select the second resource with a second number of (contiguous) sub-channels, wherein the second number of (contiguous) sub-channels is larger than the first number of (contiguous) sub-channels, and/or
the network could select the second resource with the first number of (contiguous) sub-channels, wherein a sub-channel in the second slot comprises more PRBs than a sub-channel in the first slot, and/or
the network could maintain/apply the same first MCS value of the TB on the second resource, and/or
the network could maintain/apply the same first code rate of the TB on the second resource.

In one embodiment, if the network selects the first resource in the first slot and the second resource in the second slot, (e.g., with different number of consecutive OFDM symbols for sidelink between the first slot and the second slot), wherein the second number of consecutive OFDM symbols available for sidelink is larger than the first number of consecutive OFDM symbols available for sidelink,
the network could select the second resource with less frequency resource, and/or
the network could select the second resource with a second number of (contiguous) sub-channels, wherein the second number of (contiguous) sub-channels is smaller than the first number of (contiguous), and/or
the network could select the second resource with the first number of (contiguous) sub-channels, wherein a sub-channel in the second slot comprises less PRBs than a sub-channel in the first slot; and/or
the network could maintain/apply the same first MCS value of the TB on the second resource, and/or
the network could maintain/apply the same first code rate of the TB on the second resource.

In one embodiment, the network could apply a second MCS based on at least the first code rate and/or the second resource for the TB. The network may derive a second code rate of the TB size on a candidate resource in the second slot, wherein the resource comprises the first number of (contiguous) sub-channels and the second number of OFDM symbols.

In one embodiment, the first code rate could be lower than or equal to the second code rate. The second number of (contiguous) sub-channels could be determined, derived, or generated based on the second number of consecutive OFDM symbols available for sidelink. The second number of (contiguous) sub-channels could also be determined, derived, or generated based on a ratio and/or the first number of (contiguous) sub-channels.

In one embodiment, the ratio could be derived as ceil (number of OFDM symbols available for sidelink transmission in the first slot (numerator)/number of OFDM symbols available for sidelink transmission in the second slot (denominator)). Alternatively, the ratio could be derived as ceil(14(numerator)/number of OFDM symbols available for sidelink transmission in the second slot (denominator)). The ratio may also be fixed, (pre-)configured, or specified. The second number of (contiguous) sub-channels could be the ratio*the first number of (contiguous) sub-channels).

In one embodiment, if the network indicates one sidelink transmission by the SL grant, the UE could perform one sidelink transmission (e.g., (new or initial) sidelink transmission). Furthermore, if the network indicates at least two sidelink transmissions by the SL grant, the UE could perform one sidelink transmission (e.g., (new or initial) sidelink transmission) and the other sidelink transmission (e.g., sidelink retransmission).

In one embodiment, if the first slot is earlier than the second slot, the UE could transmit a (new or initial) sidelink transmission on the first resource. The UE could transmit a sidelink retransmission on the second resource. If the first slot is later than the second slot, the UE could transmit a (new or initial) sidelink transmission on the second resource. The UE could transmit a sidelink retransmission on the first resource. The first slot may not be the same slot as the second slot.

In one embodiment, the first resource in time domain could contain or occupy the first number of OFDM symbols. The first resource in time domain could also contain or occupy (the first number of OFDM symbols minus a fourth number of OFDM symbols). The fourth number of OFDM symbols could be among the first number of OFDM symbols. The fourth number of OFDM symbols could contain sidelink available OFDM symbols not for sidelink data and/or control transmission in the first slot. The fourth number of OFDM symbols could contain OFDM symbols for any of feedback channel, TX/RX transition time, and/or AGC time, in the first slot.

In one embodiment, the second resource in time domain could contain or occupy the second number of OFDM symbols. The second resource in time domain could contain or occupy (the second number of OFDM symbols minus a fifth number of OFDM symbols). The fifth number of OFDM symbols could be among the second number of OFDM symbols. The fifth number of OFDM symbols could contain sidelink available OFDM symbols not for sidelink data and/or control transmission in the second slot. The fifth number of OFDM symbols could contain OFDM symbols for any of feedback channel, TX/RX transition time, and/or AGC time, in the third slot.

In one embodiment, the first resource in frequency domain could contain the first number of sub-channel(s). The second resource in frequency domain could contain the first number of sub-channel(s). The second resource in frequency domain could contain a second number of sub-channel(s), wherein the second number of sub-channel(s) is different from the first number of sub-channel(s). The second number of sub-channel(s) could be determined based on the first number of sub-channel(s) and/or the first number of OFDM symbols and/or the second number of OFDM symbols. A UE is in network scheduling mode (e.g., LTE V2X mode-3, and/or NR V2X mode-1).

Figure 12:
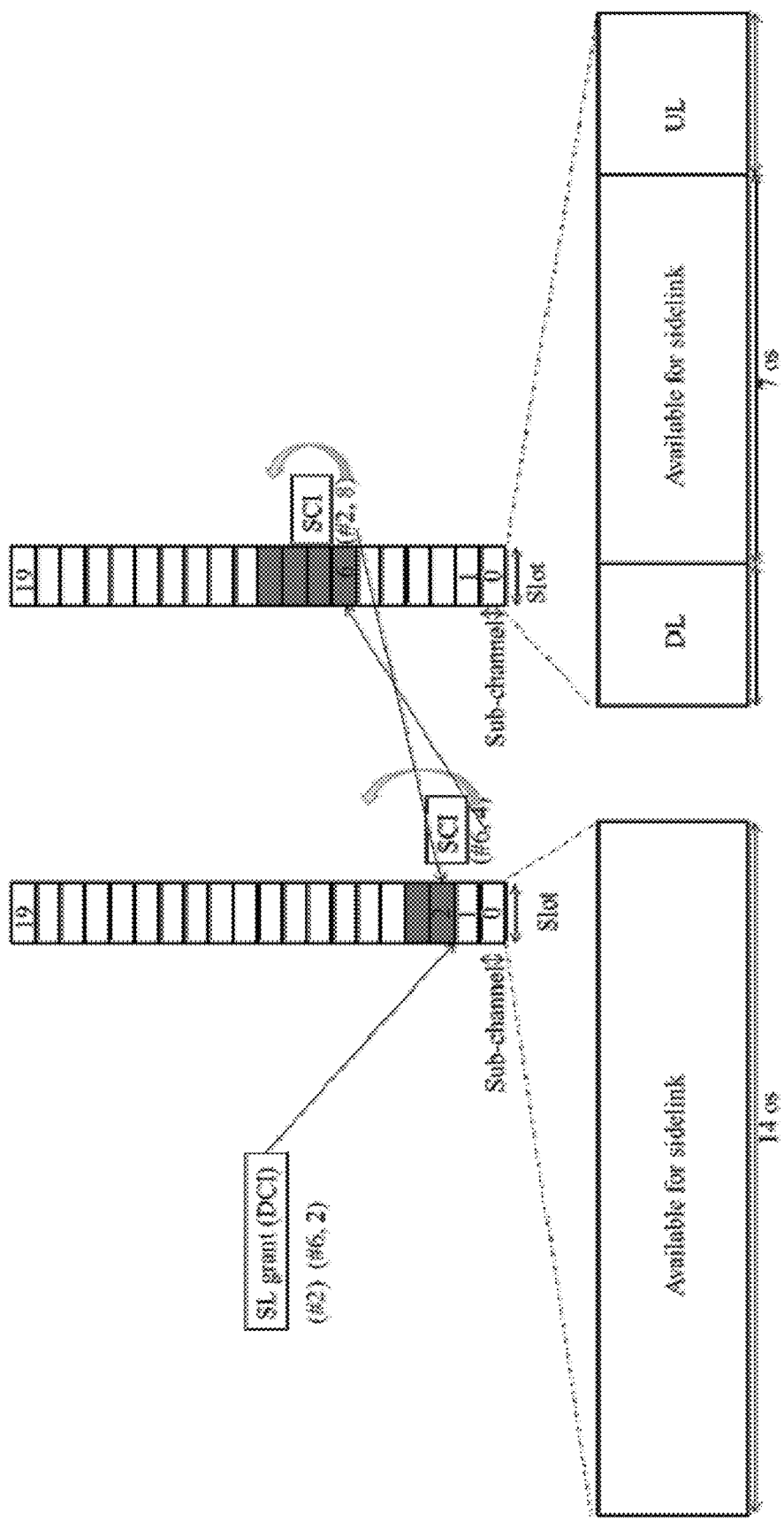
FIG. 12 is a diagram according to one exemplary embodiment.

For example, as shown in FIG. 12, a network may transmit a SL grant indicating a first resource in a first slot and a second resource in a second slot. The SL grant indicates at least a first starting sub-channel position or index (e.g., #2) and a second starting sub-channel position/index (e.g., #6) and a first length (e.g., 2). A UE (e.g., NR V2X mode-1 UE) receives the SL grant. The UE could interpret the first length based on a reference slot.

In one embodiment, the reference slot could be the first slot. The reference slot could be a slot containing a number of consecutive OFDM symbols available for sidelink. The number of consecutive OFDM symbols available for sidelink could be a reference number for deriving TB size. The reference number could be derived based on the amount of symbols for sidelink data transmission in the first slot and the amount of symbols for sidelink data transmission in the second slot. The reference number could be derived based on the first number of OFDM symbols and/or the fourth number of symbols. The reference number could be derived based on the first number of OFDM symbols excluding the fourth number of symbols. The reference slot could be a slot containing 14 OFDM symbol available for sidelink. The reference slot could be a first (available) slot after the slot where the UE receiving plus a slot offset in a sidelink resource pool.

In this example, the UE could interpret the first length for the first resource (e.g., 2). The UE could interpret the first length based on the number of OFDM symbols available for sidelink in the second slot. In this example, the UE could determine the second resource with 4 sub-channels. The UE could determine a second length based on at least a ratio and the first length. The ratio could be number of OFDM symbols in the reference slot to the number of OFDM symbols in the second slot.

In one embodiment, the UE could derive or determine frequency resource of the first resource based on at least the first length and a ratio. Frequency resource of the first resource could be the first length times a ratio. The ratio could be number of consecutive OFDM symbols available for sidelink in the reference slot to number of consecutive OFDM symbols available for sidelink in the first slot.

In one embodiment, the UE could derive or determine frequency resource of the second resource based on at least the first length and a ratio. Frequency resource of the first resource could be the first length times a ratio. The ratio could be number of consecutive OFDM symbols available for sidelink in the reference slot to number of consecutive OFDM symbols available for sidelink in the second slot.

Figure 13:
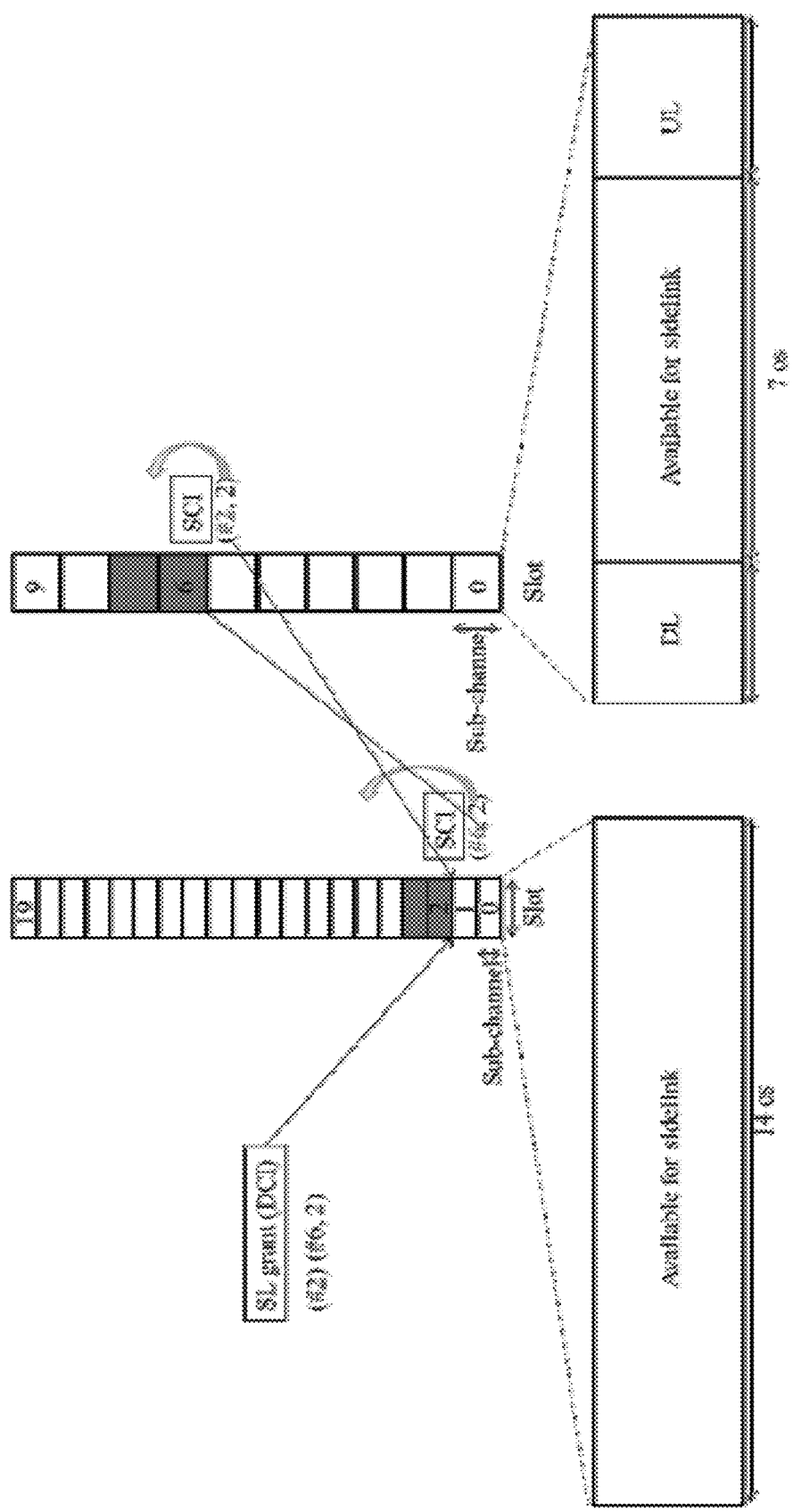
FIG. 13 is a diagram according to one exemplary embodiment.

As another example, as shown in FIG. 13, a network may transmit a SL grant indicating a first resource in a first slot and a second resource in a second slot. The SL grant indicates at least a first starting sub-channel position/index (e.g., #2) and a second starting sub-channel position or index (e.g., #6) and a first length (e.g., 2). A UE (e.g., NR V2X mode-1 UE) receives the SL grant. In one embodiment, an RIV value could be derived by the indicated SL grant would indicate the second starting sub-channel position or index and the first length. A number of bits for indicating the second starting sub-channel position or index and the first length could be determined based on number of sub-channels in a reference slot. A number of bits for indicating the first starting sub-channel position or index could be determined based on number of sub-channels in a reference slot.

In one embodiment, the reference slot could be the first slot. The reference slot could be a slot containing a number of consecutive OFDM symbols available for sidelink. The number of consecutive OFDM symbols available for sidelink could be a reference number for deriving TB size. The reference number could be derived based on the amount of symbols for sidelink data transmission in the first slot and the amount of symbols for sidelink data transmission in the second slot. The reference number could be derived based on the first number of OFDM symbols and/or the fourth number of symbols. The reference number could be derived based on the first number of OFDM symbols excluding the fourth number of symbols. The reference slot could be a slot containing 14 OFDM symbol available for sidelink. The reference slot could be a first (available) slot after the slot where the UE receiving plus a slot offset in a sidelink resource pool.

In this example, a UE could be configured with a carrier, wherein a slot in the carrier contains all OFDM symbols or a subset of OFDM symbols available for sidelink transmission. The UE could be given a first number of frequency units. The UE could perform resource selection among a plurality of slot(s) on the carrier. The UE could select a first resource in a first slot for a first sidelink transmission of a TB, wherein the first resource contains the first number of frequency units.

When the UE selects a second resource for a second sidelink transmission of the TB, the UE may not select the second resource in a second slot, wherein the second slot contains different number of consecutive OFDM symbols for sidelink. The UE could perform the first sidelink transmission of the TB on the first resource. The UE could perform the second sidelink transmission of the TB on the second resource.

In one embodiment, the UE may not select the second resource for a second sidelink transmission of the TB in a second slot, when/in response to the second slot contains a second number of consecutive OFDM symbols for sidelink, and the second number of OFDM symbols is different from the first number of OFDM symbols.

In one embodiment, the UE could be configured with a carrier, wherein at least a one slot or a plurality of slots in the carrier contains all OFDM symbols or a subset of OFDM symbols available for sidelink transmission. The UE could select a second resource for a second sidelink transmission of the TB, wherein resources in the second slot are excluded from selecting the second resource. The UE could also select a second resource for a second sidelink transmission of the TB, wherein the UE excludes the resource in the second slot from selecting the second resource.

In one embodiment, the UE could be configured with a resource pool, wherein the resource pool comprises a first slot containing a first number of OFDM symbols available for sidelink transmission and/or a second slot containing a second number of OFDM symbols available for sidelink transmission. The UE could perform resource selection among a plurality of candidate resources in the resource pool. The second number of OFDM symbols could be smaller than the first number of OFDM symbols. When the UE selects the second resource, the UE could exclude the first resource, a resource in the first slot, and/or a resource in the second slot.

In one embodiment, the UE could select the second resource on a third slot, wherein the third slot contains a third number of consecutive OFDM symbols available for sidelink transmission. The third number of OFDM symbols could also be larger than or equal to the first number of OFDM symbols.

In one embodiment, the first slot could be among the plurality of slot(s). The second slot could be among the plurality of slot(s). The third slot could be among the plurality of slot(s).

In one embodiment, the first slot and the second slot could be different slots. The first slot and the third slot could be different slots. If the first slot is earlier than the third slot, the first sidelink transmission of the TB could be the initial or new sidelink transmission of the TB. If the first slot is earlier than the third slot, the second sidelink transmission of the TB could be sidelink retransmission of the TB.

In one embodiment, if the third slot is earlier than the first slot, the second sidelink transmission of the TB could be initial or new sidelink transmission of the TB. If the third slot is earlier than the first slot, the first sidelink transmission of the TB could be sidelink retransmission of the TB.

In one embodiment, the first number of OFDM symbols and the second number of OFDM symbols and the third number of OFDM symbols could be semi-statically configured. The first number of OFDM symbols and the second number of OFDM symbols and the third number of OFDM symbols may not be changed or impacted by dynamic signalling.

In one embodiment, when the UE selects the second resource, the UE could select a candidate resource in the third slot for the second resource, wherein the third slot is earlier than the first slot, and the third number is smaller than or equal to the first number. When the UE selects the second resource, the UE may not select a candidate resource in the second slot for the second resource, wherein the second slot is earlier than the first slot, and the second number is larger than the first number. When the UE selects the second resource, the UE could select a candidate resource in the third slot for the second resource, wherein the third slot is latter than the first slot, and the third number is larger than or equal to the first number. When the UE selects the second resource, the UE may not select a candidate resource in the second slot for the second resource, wherein the second slot is latter than the first slot, and the second number is smaller than the first number.

In one embodiment, the first resource in time domain could contain or occupy the first number of OFDM symbols. The first resource in time domain could also contain or occupy (the first number of OFDM symbols minus a fourth number of OFDM symbols). The fourth number of OFDM symbols could be among the first number of OFDM symbols. The fourth number of OFDM symbols could contain sidelink available OFDM symbols not for sidelink data and/or control transmission in the first slot. The fourth number of OFDM symbols could also contain OFDM symbols for feedback channel in the first slot.

In one embodiment, the second resource in time domain could contain or occupy the third number of OFDM symbols. The second resource in time domain could also contain or occupy (the second number of OFDM symbols minus a fifth number of OFDM symbols). The fifth number of OFDM symbols could be among the third number of OFDM symbols. The fifth number of OFDM symbols could contain sidelink available OFDM symbols not for sidelink data and/or control transmission in the third slot. The fifth number of OFDM symbols could also contain OFDM symbols for feedback channel in the third slot.

In one embodiment, the first resource in frequency domain could contain the first number of sub-channel(s). The second resource in frequency domain could contain the first number of sub-channel(s). The second resource in frequency domain could also contain a second number of sub-channel(s), wherein the second number of sub-channel(s) is different from the first number of sub-channel(s). The second number of sub-channel(s) could be determined based on the first number of sub-channel(s) and/or the first number of OFDM symbols and/or the third number of OFDM symbols. The UE could be in autonomous resource selection mode (e.g., LTE V2X mode-4, and/or NR V2X mode-2).

In this embodiment, a network may configure a UE with a carrier, wherein a slot in the carrier contains all OFDM symbols or a subset of OFDM symbols available for sidelink transmission. The network could transmit a DCI to the UE. The DCI could indicate a first resource in a first slot for a first transmission of a TB and a second resource in a second slot for a second sidelink transmission of the TB. The first slot may contain a first number of consecutive OFDM symbols available for sidelink. The second slot may contain a second number of consecutive OFDM symbols available for sidelink. The network may not be allowed to indicate the first resource and the second resource if the first number of OFDM symbols is different from the second number of OFDM symbols.

In one embodiment, the network may configure a UE with a resource pool in a carrier, wherein the resource pool comprises a first slot containing a first number of OFDM symbols available for sidelink transmission and/or a second slot containing a second number of OFDM symbols available for sidelink transmission. The UE may perform the first sidelink transmission of the TB on the first resource. The UE may perform the second sidelink transmission of the TB on the second resource.

In one embodiment, the network could select a second resource for a second transmission of the TB, wherein the resource in the second slot may be precluded or may not be allowed for selecting the second resource. The network could transmit a DCI to the UE, wherein the DCI indicates the first resource and the second resource.

In one embodiment, the second number of OFDM symbols could be smaller than the first number of OFDM symbols. The second resource could be in a third slot, wherein the third slot contains a third number of consecutive OFDM symbols available for sidelink transmission. The third number of OFDM symbols could be larger than or equal to the first number of OFDM symbols.

In one embodiment, the first slot and the second slot could be different slots. The first slot and the third slot could also be different slots. If the first slot is earlier than the third slot, the first sidelink transmission of the TB could be initial or new sidelink transmission of the TB. If the first slot is earlier than the third slot, the second sidelink transmission of the TB could be sidelink retransmission of the TB. If the third slot is earlier than the first slot, the second sidelink transmission of the TB could be initial or new sidelink transmission of the TB. Furthermore, if the third slot is earlier than the first slot, the first sidelink transmission of the TB could be sidelink retransmission of the TB.

In one embodiment, the first number of OFDM symbols, the second number of OFDM symbols, and the third number of OFDM symbols could be semi-statically configured. Furthermore, the first number of OFDM symbols and the second number of OFDM symbols and the third number of OFDM symbols may not be changed or impacted by dynamic signalling. The first resource in time domain could contain or occupy the first number of OFDM symbols. The first resource in time domain could also contain or occupy (the first number of OFDM symbols minus a fourth number of OFDM symbols).

In one embodiment, the fourth number of OFDM symbols could be among the first number of OFDM symbols. The fourth number of OFDM symbols could contain sidelink available OFDM symbols not for sidelink data and/or control transmission in the first slot. The fourth number of OFDM symbols could also contain OFDM symbols for feedback channel in the first slot.

In one embodiment, the second resource in time domain could contain or occupy the third number of OFDM symbols. The second resource in time domain could also contain or occupy (the second number of OFDM symbols minus a fifth number of OFDM symbols).

In one embodiment, the fifth number of OFDM symbols could be among the third number of OFDM symbols. The fifth number of OFDM symbols could contain sidelink available OFDM symbols not for sidelink data and/or control transmission in the third slot. The fifth number of OFDM symbols could also contain OFDM symbols for feedback channel in the third slot.

In one embodiment, the first resource in frequency domain could contain the first number of sub-channel(s). The second resource in frequency domain could also contain the first number of sub-channel(s). The second resource in frequency domain could contain a second number of sub-channel(s), wherein the second number of sub-channel(s) is different from the first number of sub-channel(s). The second number of sub-channel(s) could be determined based on the first number of sub-channel(s) and/or the first number of OFDM symbols and/or the third number of OFDM symbols.

In one embodiment, the UE could be in network scheduling mode (e.g., LTE V2X mode-3, and/or NR V2X mode-1).

In this embodiment, a UE could be configured with a carrier, wherein a slot in the carrier contains all OFDM symbols or a subset of OFDM symbols available for sidelink transmission. The UE could be given a first number of frequency units. The UE could perform resource selection among a plurality of slot(s) on the carrier. The UE could select a first resource in a first slot for a first sidelink transmission of a TB, wherein the first resource contains the first number of frequency units. When the UE selects a second resource in a second slot for a second sidelink transmission of the TB, wherein the second contains a second number of consecutive OFDM symbols available for sidelink, and the second number of OFDM symbols is smaller than the first number of OFDM symbols, the UE could select the second resource with more frequency resource than the first resource.

In one embodiment, the UE could be configured with a resource pool in a carrier, wherein the resource pool comprises a first slot containing a first number of OFDM symbols available for sidelink transmission and/or a second slot containing a second number of OFDM symbols available for sidelink transmission. The UE could perform resource selection among a plurality of candidate resources in the resource pool. The UE could perform the first sidelink transmission of the TB on the first resource, and/or the second sidelink transmission of the TB on the second resource. The UE could also perform the first sidelink transmission of part of the TB on the first resource, and/or the second sidelink transmission of part of the TB on the first resource.

In one embodiment, the UE could select a second resource in the second slot for a second sidelink transmission of the TB, wherein the second resource is with more frequency resource than the first resource. Part of the TB could be a first number of CBG (Code Block Group). The TB may comprise a second number of CBG. The first number of CBG could be smaller than the second number of CBG.

In one embodiment, the second resource could contain a second number of frequency units, wherein the second number of frequency units is larger than or equal to the first number of frequency units. The second number of frequency units could be determined, derived, or generated based on the second number of consecutive OFDM symbols available for sidelink. The second number of frequency units could also be determined, derived, or generated based on a ratio and/or the first number of frequency units.

In one embodiment, the ratio could be derived as ceil (number of OFDM symbols available for sidelink transmission in the first slot (numerator)/number of OFDM symbols available for sidelink transmission in the second slot (denominator)). Alternatively, the ratio could be derived as ceil(14(numerator)/number of OFDM symbols available for sidelink transmission in the second slot (denominator)).

In one embodiment, the second number of (contiguous) sub-channels could be the ratio*the first number of frequency units. The frequency unit could be a PRB, or a sub-channel. The first sub-channel or a frequency unit in the first slot may contain a first number of (consecutive) PRBs. A second sub-channel or a frequency in the second slot may contain a second number of (consecutive) PRBs.

In one embodiment, the second resource could contain the first number of frequency units, wherein a frequency unit in the second slot comprises more PRBs than a frequency unit in the first slot. The second resource could also contain the first number of frequency units, wherein the second number of (consecutive) PRBs is larger than the first number of (consecutive) PRBs.

In one embodiment, the UE may derive a TB size at least based on the first number of (contiguous) sub-channels and the first number of OFDM symbols. The UE may also derive a TB size based on the first resource.

In one embodiment, the UE could apply a first MCS based on at least the first code rate and/or the first resource for the TB. The UE may derive a first code rate of the TB size based on the first MCS and/or the first resource. The UE could maintain or apply the same first MCS value of the TB on the second resource. The UE could also maintain or apply the same first code rate of the TB on the second resource.

In one embodiment, the UE could be in autonomous resource selection mode (e.g., LTE V2X mode-4, and/or NR V2X mode-2).

All or some of above embodiments can be formed to a new embodiment. The OFDM symbols available for sidelink transmission may mean the OFDM symbols available for PSSCH transmission. The OFDM symbols available for sidelink transmission may also mean the OFDM symbols available for PSCCH and/or PSSCH transmission. Furthermore, the OFDM symbols available for sidelink transmission may mean the OFDM symbols available for PSCCH, PSSCH, and/or PSFCH transmission.

In one embodiment, the UE could be a device performing sidelink transmission. Alternatively, the UE could be a vehicle.

Figure 14:
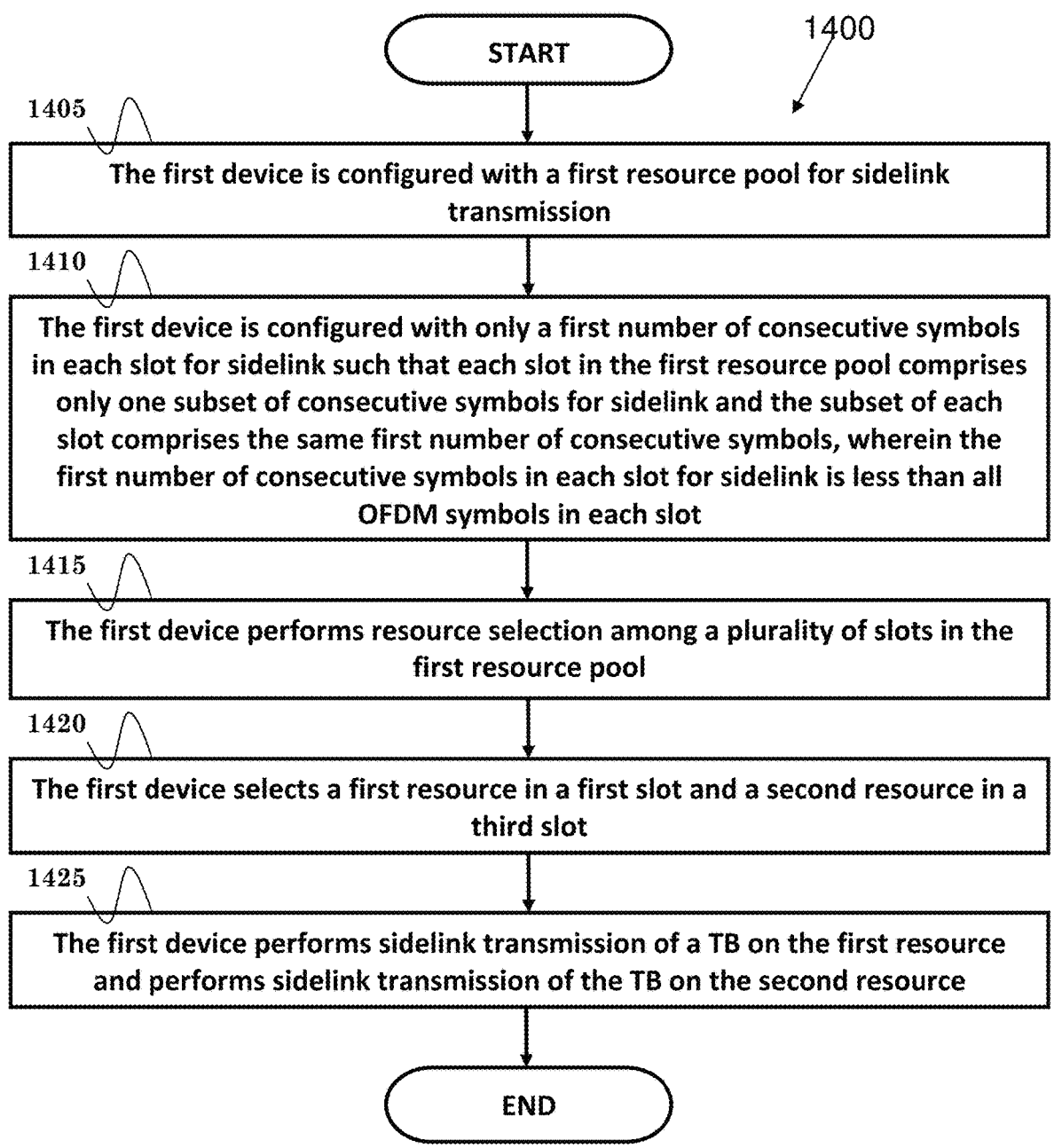
FIG. 14 is a flow chart according to one exemplary embodiment.

FIG. 14 is a flow chart 1400 according to one exemplary embodiment from the perspective of a first device for performing sidelink transmission to a second device. In step 1405, the first device is configured with a first resource pool for sidelink transmission. In step 1410, the first device is configured with only a first number of consecutive symbols in each slot for sidelink such that each slot in the first resource pool comprises only one subset of consecutive symbols for sidelink and the subset of each slot comprises the same first number of consecutive symbols, wherein the first number of consecutive symbols in each slot for sidelink is less than all OFDM (Orthogonal Frequency Division Multiplexing) symbols in each slot. In step 1415, the first device performs resource selection among a plurality of slots in the first resource pool. In step 1420, the first device selects a first resource in a first slot and a second resource in a third slot. In step 1425, the first device performs sidelink transmission of a TB on the first resource and performs sidelink transmission of the TB on the second resource.

In one embodiment, each slot comprises 14 OFDM symbols and the first number of consecutive symbols in each slot for sidelink is less than 14 symbols.

In one embodiment, the first resource may contain symbols among the first number of consecutive symbols in the first slot and/or the second resource contains symbols among the first number of consecutive symbols in the third slot. The first resource may also contain the first number of consecutive symbols excluding a third number of symbols, wherein the third number of symbols is among the first number of consecutive symbols, and wherein the third number of symbols is not used for sidelink data transmission, and/or the third number of symbols is used for any of (sidelink) feedback channel, transition gap, or AGC symbol, in the first slot. Furthermore, the second resource may contain the first number of consecutive symbols excluding a fourth number of symbols, wherein the fourth number of symbols is among the first number of consecutive symbols, and wherein the fourth number of symbols is not used for sidelink data transmission, and/or wherein the fourth number of symbols is used for any of (sidelink) feedback channel, transition gap, or AGC symbol, in the third slot. In one embodiment, the third number could be the same or different from the fourth number.

In one embodiment, the first symbol among the first number of consecutive symbols in each slot in the first resource pool could be used for AGC setting and/or the last symbol among the first number of consecutive symbols in each slot in the first resource pool is used for a transition gap. The first symbol among the first number of consecutive symbols in a slot in the first resource pool could be the symbol other than the first symbol in the slot.

In one embodiment, the first resource could start from the first symbol among the first number of consecutive symbols excluding the third number of symbols. The second resource could start from the first symbol among the first number of consecutive symbols excluding the fourth number of symbols.

In one embodiment, for the slot comprising the first number of consecutive symbols for sidelink, the slot may comprise downlink symbol(s) and/or uplink symbol(s), wherein the downlink symbol(s) are earlier than the first number of consecutive symbols and/or the uplink symbol(s) are latter than the first number of consecutive symbols. The first device may not expect that the first resource pool comprises a second slot, comprising a number of consecutive symbols for sidelink different from the first number.

In one embodiment, the plurality of slots may comprise a first slot and a third slot, and/or the first slot and the third slot are different slots in the first resource pool. The first resource in frequency domain could contain a first number of sub-channel(s) and the second resource in frequency domain contains a second number of sub-channel(s), wherein the second number of sub-channel(s) is the same or different from the first number of sub-channel(s).

In one embodiment, the first device could derive TB size of the TB at least based on the first number of sub-channel(s) and/or the first number of consecutive symbols excluding the third number of symbols. The first device could also derive TB size of the TB at least based on the first number of sub-channel(s) and/or the first number of consecutive symbols excluding the fourth number of symbols.

In one embodiment, the first device could derive TB size of the TB at least based on the first number of sub-channel(s) and/or a referenced number of consecutive symbols in a (reference) slot. The reference number of consecutive symbols could be derived based on the first number of consecutive symbols and/or the third number of symbols and/or the fourth number of symbols. The reference number of consecutive symbols could be the amount of symbols available for sidelink in a slot. The reference number of consecutive symbols could be the amount of symbols available for sidelink data transmission (e.g., PSSCH) in a slot. The reference number of consecutive symbols could be the first number of consecutive symbols. The reference number of consecutive symbols could be the first number of consecutive symbols excluding the third number of symbols. The reference number of consecutive symbols could be the first number of consecutive symbols excluding the fourth number of symbols. The reference slot and/or the reference number of consecutive symbols could be associated to the first resource pool.

In one embodiment, the first device could indicate the reference number of consecutive symbols for deriving TB size to the second device. The first device could indicate the reference number of symbols via PC5-RRC signaling (i.e., via a semi-statically signaling). The first device and/or the second device could derive TB size based on the reference number of consecutive symbols regardless of number of symbols in the first resource or the second resource.

In one embodiment, the first device could be configured with a second resource pool, and wherein the first device is configured with only a second number of consecutive symbols in each slot for sidelink such that each slot in the second resource pool comprises the same second number of consecutive symbols for sidelink. The second resource pool and the first resource pool could be in a same carrier or in different carriers.

Referring back to FIGS. 3 and 4, in one exemplary embodiment of a first device for performing sidelink transmission to a second device, the first device is configured with a first resource pool for sidelink transmission, and is configured with only a first number of consecutive symbols in each slot for sidelink such that each slot in the first resource pool comprises only one subset of consecutive symbols for sidelink and the subset of each slot comprises the same first number of consecutive symbols, wherein the first number of consecutive symbols in each slot for sidelink is less than all OFDM (Orthogonal Frequency Division Multiplexing) symbols in each slot. The first device 300 includes a program code 312 stored in the memory 310. The CPU 308 could execute program code 312 to enable the first device (i) to perform resource selection among a plurality of slots in the first resource pool, (ii) to select a first resource in a first slot and a second resource in a third slot, and (iii) to perform sidelink transmission of a TB on the first resource and performs sidelink transmission of the TB on the second resource. Furthermore, the CPU 308 can execute the program code 312 to perform all of the above-described actions and steps or others described herein.

Figure 15:
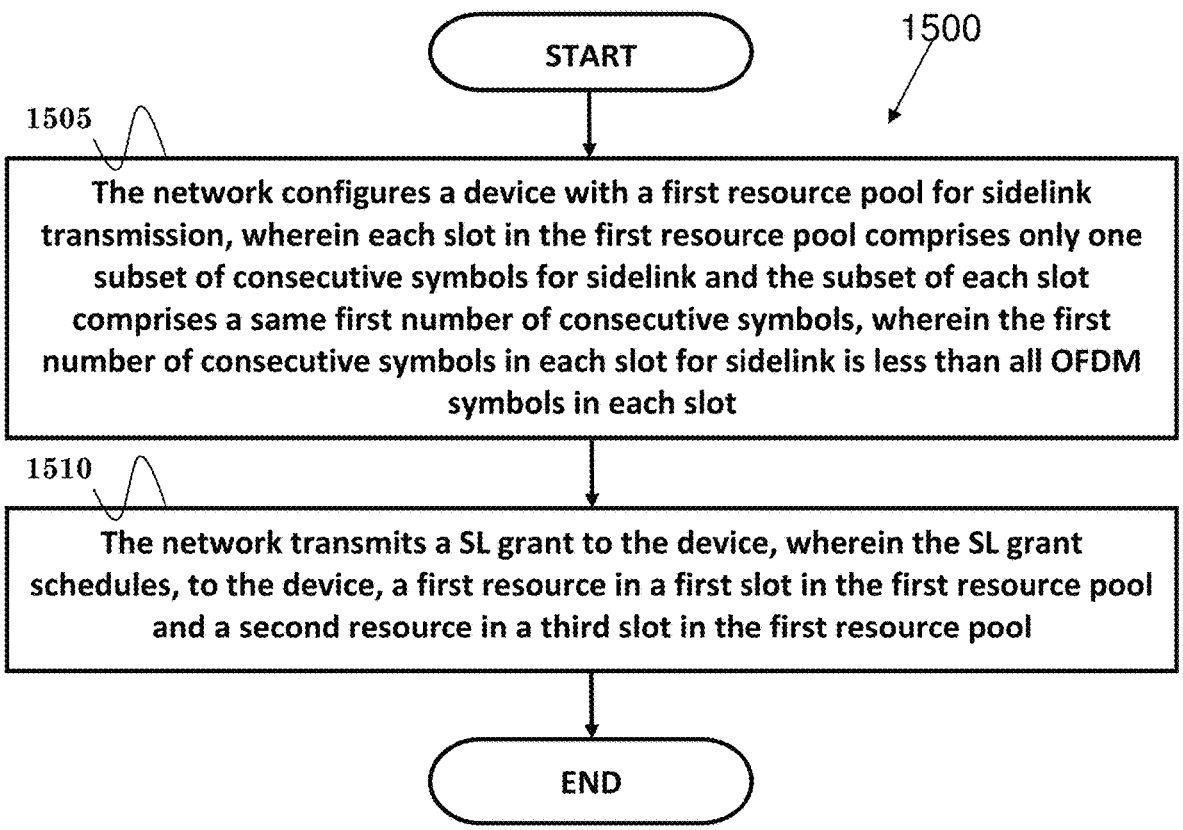
FIG. 15 is a flow chart according to one exemplary embodiment.

FIG. 15 is a flow chart 1500 according to one exemplary embodiment from the perspective of a network scheduling sidelink transmission. In step 1505, the network configures a device with a first resource pool for sidelink transmission, wherein each slot in the first resource pool comprises only one subset of consecutive symbols for sidelink and the subset of each slot comprises a same first number of consecutive symbols, wherein the first number of consecutive symbols in each slot for sidelink is less than all OFDM (Orthogonal Frequency Division Multiplexing) symbols in each slot. In step 1510, the network transmits a SL grant to the device, wherein the SL grant schedules, to the device, a first resource in a first slot in the first resource pool and a second resource in a third slot in the first resource pool.

In one embodiment, each slot comprises 14 OFDM symbols and the first number of consecutive symbols in each slot for sidelink is less than 14 symbols.

In one embodiment, the network may configure the device with only the first number of consecutive symbols in each slot for sidelink. The first resource may contain symbols among the first number of consecutive symbols in the first slot and/or the second resource contains symbols among the first number of consecutive symbols in the third slot. The first resource may also contain the first number of consecutive symbols excluding a third number of symbols, wherein the third number of symbols is among the first number of consecutive symbols, and wherein the third number of symbols is not used for sidelink data transmission, and/or the third number of symbols is used for any of (sidelink) feedback channel, transition gap, or AGC symbol, in the first slot. Furthermore, the second resource may contain the first number of consecutive symbols excluding a fourth number of symbols, wherein the fourth number of symbols is among the first number of consecutive symbols, and wherein the fourth number of symbols is not used for sidelink data transmission, and/or wherein the fourth number of symbols is used for any of (sidelink) feedback channel, transition gap, or AGC symbol, in the third slot. The third number could be the same or different from the fourth number.

In one embodiment, the first symbol among the first number of consecutive symbols in each slot in the first resource pool is used for AGC setting and/or the last symbol among the first number of consecutive symbols in each slot in the first resource pool is used for a transition gap. The first symbol could be among the first number of consecutive symbols in a slot in the first resource pool is the symbol other than the first symbol in the slot. The first resource could start from the first symbol among the first number of consecutive symbols excluding the third number of symbols, and/or the second resource could start from the first symbol among the first number of consecutive symbols excluding the fourth number of symbols.

In one embodiment, for the slot comprising the first number of consecutive symbols for sidelink, the slot comprises downlink symbol(s) and/or uplink symbol(s), wherein the downlink symbol(s) are earlier than the first number of consecutive symbols and/or the uplink symbol(s) are latter than the first number of consecutive symbols.

Referring back to FIGS. 3 and 4, in one exemplary embodiment of a network scheduling sidelink transmission, the network device 300 includes a program code 312 stored in the memory 310. The CPU 308 could execute program code 312 to enable the network device (i) to configure a device with a first resource pool for sidelink transmission, wherein each slot in the first resource pool comprises only one subset of consecutive symbols for sidelink and the subset of each slot comprises a same first number of consecutive symbols, wherein the first number of consecutive symbols in each slot for sidelink is less than all OFDM (Orthogonal Frequency Division Multiplexing) symbols in each slot, and (ii) to transmit a SL grant to the device, wherein the SL grant schedules, to the device, a first resource in a first slot in the first resource pool and a second resource in a third slot in the first resource pool. Furthermore, the CPU 308 can execute the program code 312 to perform all of the above-described actions and steps or others described herein.

Figure 16:
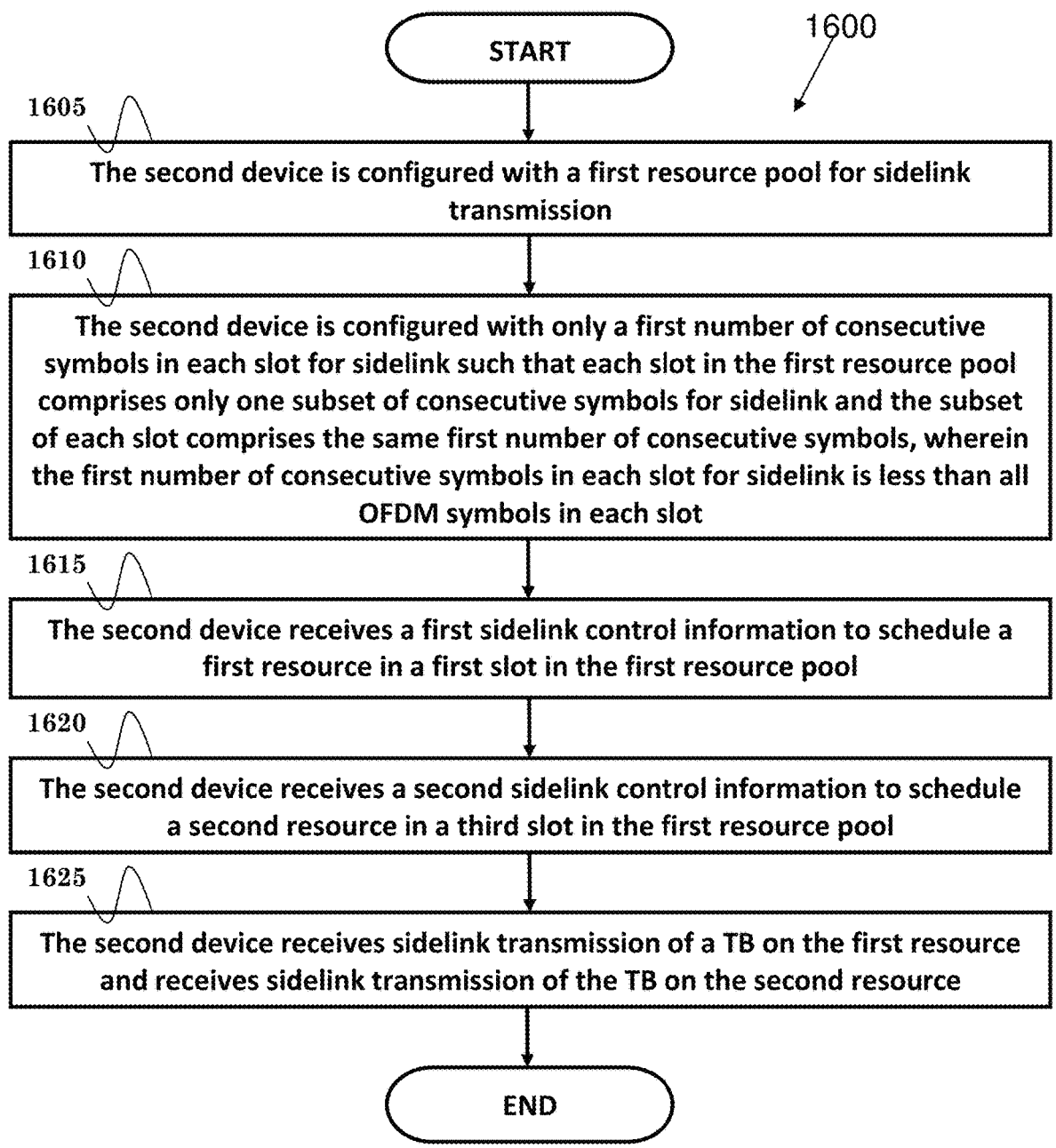
FIG. 16 is a flow chart according to one exemplary embodiment.

FIG. 16 is a flow chart 1600 according to one exemplary embodiment from the perspective of a second device for performing sidelink communication. In step 1605, the second device is configured with a first resource pool for sidelink transmission. In step 1610, the second device is configured with only a first number of consecutive symbols in each slot for sidelink such that each slot in the first resource pool comprises only one subset of consecutive symbols for sidelink and the subset of each slot comprises the same first number of consecutive symbols, wherein the first number of consecutive symbols in each slot for sidelink is less than all OFDM (Orthogonal Frequency Division Multiplexing) symbols in each slot. In step 1615, the second device receives a first sidelink control information to schedule a first resource in a first slot in the first resource pool. In step 1620, the second device receives a second sidelink control information to schedule a second resource in a third slot in the first resource pool. In step 1625, the second device receives sidelink transmission of a TB on the first resource and receives sidelink transmission of the TB on the second resource.

In one embodiment, each slot comprises 14 OFDM symbols and the first number of consecutive symbols in each slot for sidelink is less than 14 symbols.

In one embodiment, the first resource may contain symbols among the first number of consecutive symbols in the first slot and/or the second resource contains symbols among the first number of consecutive symbols in the third slot. The first resource may also contain the first number of consecutive symbols excluding a third number of symbols, wherein the third number of symbols is among the first number of consecutive symbols, and wherein the third number of symbols is not used for sidelink data transmission, and/or the third number of symbols is used for any of (sidelink) feedback channel, transition gap, or AGC symbol, in the first slot. Furthermore, the second resource may contain the first number of consecutive symbols excluding a fourth number of symbols, wherein the fourth number of symbols is among the first number of consecutive symbols, and wherein the fourth number of symbols is not used for sidelink data transmission, and/or wherein the fourth number of symbols is used for any of (sidelink) feedback channel, transition gap, or AGC symbol, in the third slot. In one embodiment, the third number could be the same or different from the fourth number.

In one embodiment, the first symbol among the first number of consecutive symbols in each slot in the first resource pool could be used for AGC setting and/or the last symbol among the first number of consecutive symbols in each slot in the first resource pool is used for a transition gap. The first symbol among the first number of consecutive symbols in a slot in the first resource pool could also be the symbol other than the first symbol in the slot.

In one embodiment, the first resource could start from the first symbol among the first number of consecutive symbols excluding the third number of symbols. The second resource could start from the first symbol among the first number of consecutive symbols excluding the fourth number of symbols.

In one embodiment, for the slot comprising the first number of consecutive symbols for sidelink, the slot may comprise downlink symbol(s) and/or uplink symbol(s), wherein the downlink symbol(s) are earlier than the first number of consecutive symbols and/or the uplink symbol(s) are latter than the first number of consecutive symbols. The second device may not expect that the first resource pool comprises a second slot, comprising a number of consecutive symbols for sidelink different from the first number.

In one embodiment, the plurality of slots may comprise a first slot and a third slot, and the first slot and the third slot are different slots in the first resource pool. The first resource in frequency domain may contain a first number of sub-channel(s) and the second resource in frequency domain contains a second number of sub-channel(s), wherein the second number of sub-channel(s) is the same or different from the first number of sub-channel(s).

In one embodiment, if the first slot is earlier than the third slot, the first device could derive that the second resource contains more sub-channel(s) than the first resource. Furthermore, if the first slot is latter than the third slot, the first device could derive that the first resource contains more sub-channel(s) than the second resource.

Alternatively, if the first slot is earlier than the third slot, the second device could derive TB size of the TB at least based on the second resource. Furthermore, if the first slot is latter than the third slot, the second device could derive TB size of the TB at least based on the first resource. The second device could derive TB size of the TB at least based on the first number of sub-channel(s) and/or the first number of consecutive symbols excluding the third number of symbols. Alternatively, the second device could derive TB size of the TB at least based on the first number of sub-channel(s) and/or the first number of consecutive symbols excluding the fourth number of symbols.

In one embodiment, the second device could be configured with a second resource pool. The second device could also be configured with only a second number of consecutive symbols in each slot for sidelink such that each slot in the second resource pool comprises the same second number of consecutive symbols for sidelink. The second resource pool and the first resource pool could be in a same carrier or in different carriers.

Referring back to FIGS. 3 and 4, in one exemplary embodiment of a second device for performing sidelink communication, the second device is configured with a first resource pool for sidelink transmission and is also configured with only a first number of consecutive symbols in each slot for sidelink such that each slot in the first resource pool comprises only one subset of consecutive symbols for sidelink and the subset of each slot comprises the same first number of consecutive symbols, wherein the first number of consecutive symbols in each slot for sidelink is less than all OFDM (Orthogonal Frequency Division Multiplexing) symbols in each slot. The device 300 includes a program code 312 stored in the memory 310. The CPU 308 could execute program code 312 to enable the second device (i) to receive a first sidelink control information to schedule a first resource in a first slot in the first resource pool, (ii) to receive a second sidelink control information to schedule a second resource in a third slot in the first resource pool, and (iii) to receive sidelink transmission of a TB on the first resource and receives sidelink transmission of the TB on the second resource. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device for performing sidelink transmission to a second device, comprising:
   the first device is configured with a first resource pool for sidelink transmission;
   the first device is configured with only a first number of consecutive symbols in each slot for sidelink such that each slot in the first resource pool comprises only one subset of consecutive symbols for sidelink and the subset of each slot comprises the same first number of consecutive symbols, wherein the first number of consecutive symbols in each slot for sidelink is less than all OFDM (Orthogonal Frequency Division Multiplexing) symbols in each slot;
   the first device performs resource selection among a plurality of slots in the first resource pool;
   the first device selects a first resource in a first slot and a second resource in a third slot, wherein for the first slot and the third slot comprising the first number of consecutive symbols for sidelink, the first slot and the third slot comprise downlink symbol(s) and/or uplink symbol(s), wherein the downlink symbol(s) are earlier than the first number of consecutive symbols and/or the uplink symbol(s) are later than the first number of consecutive symbols; and
   the first device performs sidelink transmission of a TB (Transport Block) on the first resource and performs sidelink transmission of the TB on the second resource.

2. The method of claim 1, further comprising:
   the first resource contains the first number of consecutive symbols excluding a third number of symbols, wherein the third number of symbols is among the first number of consecutive symbols, and wherein the third number of symbols is not used for sidelink data transmission, and/or the third number of symbols is used for any of feedback channel, transition gap, or AGC (Automatic Gain Control) symbol, in the first slot; and/or
   the second resource contains the first number of consecutive symbols excluding a fourth number of symbols, wherein the fourth number of symbols is among the first number of consecutive symbols, and wherein the fourth number of symbols is not used for sidelink data transmission, and/or wherein the fourth number of symbols is used for any of feedback channel, transition gap, or AGC symbol, in the third slot; and
   the third number is the same or different from the fourth number.

3. The method of claim 2, wherein the first resource starts from the first symbol among the first number of consecutive symbols excluding the third number of symbols, and/or wherein the second resource starts from the first symbol among the first number of consecutive symbols excluding the fourth number of symbols.

4. The method of claim 1, wherein the first symbol among the first number of consecutive symbols in each slot in the first resource pool is used for AGC setting and/or the last symbol among the first number of consecutive symbols in each slot in the first resource pool is used for a transition gap.

5. The method of claim 1, wherein the first symbol among the first number of consecutive symbols in a slot in the first resource pool is the symbol other than the first symbol in the slot.

6. The method of claim 1, wherein the first device does not expect that the first resource pool comprises a second slot, comprising a number of consecutive symbols for sidelink different from the first number.

7. The method of claim 1, wherein the plurality of slots comprises a first slot and a third slot, and/or the first slot and the third slot are different slots in the first resource pool.

8. The method of claim 1, further comprising:
   the first resource in frequency domain contains a first number of sub-channel(s) and the second resource in frequency domain contains a second number of sub-channel(s), wherein the second number of sub-channel(s) is the same or different from the first number of sub-channel(s).

9. The method of claim 1, wherein the first device is configured with a second resource pool, and wherein the first device is configured with only a second number of consecutive symbols in each slot for sidelink such that each slot in the second resource pool comprises the same second number of consecutive symbols for sidelink; and the second resource pool and the first resource pool are in a same carrier or in different carriers.

10. A method of a network scheduling sidelink transmission, comprising:

the network configures a device with a first resource pool for sidelink transmission, wherein each slot in the first resource pool comprises only one subset of consecutive symbols for sidelink and the subset of each slot comprises a same first number of consecutive symbols, wherein the first number of consecutive symbols in each slot for sidelink is less than all OFDM (Orthogonal Frequency Division Multiplexing) symbols in each slot; and the network transmits a SL (Sidelink) grant to the device, wherein the SL grant schedules, to the device, a first resource in a first slot in the first resource pool and a second resource in a third slot in the first resource pool, wherein for the first slot and the third slot comprising the first number of consecutive symbols for sidelink, the first slot and the third slot comprise downlink symbol(s) and/or uplink symbol(s), wherein the downlink symbol(s) are earlier than the first number of consecutive symbols and/or the uplink symbol(s) are later than the first number of consecutive symbols.

11. The method of claim 10, further comprising:
the network configures the device with only the first number of consecutive symbols in each slot for sidelink.

12. The method of claim 10, further comprising:
the first resource contains symbols among the first number of consecutive symbols in the first slot and/or the second resource contains symbols among the first number of consecutive symbols in the third slot.

13. The method of claim 10, further comprising:
the first resource contains the first number of consecutive symbols excluding a third number of symbols, wherein the third number of symbols is among the first number of consecutive symbols, and wherein the third number of symbols is not used for sidelink data transmission, and/or the third number of symbols is used for any of feedback channel, transition gap, or AGC (Automatic Gain Control) symbol, in the first slot; and/or
the second resource contains the first number of consecutive symbols excluding a fourth number of symbols, wherein the fourth number of symbols is among the first number of consecutive symbols, and wherein the fourth number of symbols is not used for sidelink data transmission, and/or wherein the fourth number of symbols is used for any of feedback channel, transition gap, or AGC symbol, in the third slot; and
the third number is the same or different from the fourth number.

14. The method of claim 13, wherein the first resource starts from the first symbol among the first number of consecutive symbols excluding the third number of symbols, and/or the second resource starts from the first symbol among the first number of consecutive symbols excluding the fourth number of symbols.

15. The method of claim 10, wherein the first symbol among the first number of consecutive symbols in each slot in the first resource pool is used for AGC setting and/or the last symbol among the first number of consecutive symbols in each slot in the first resource pool is used for a transition gap.

16. The method of claim 10, wherein the first symbol among the first number of consecutive symbols in a slot in the first resource pool is the symbol other than the first symbol in the slot.

17. A method of a first device for performing sidelink transmission to a second device, comprising:

the first device is configured with a first resource pool for sidelink transmission;

the first device is configured with only a first number of consecutive symbols in each slot for sidelink such that each slot in the first resource pool comprises only one subset of consecutive symbols for sidelink and the subset of each slot comprises the same first number of consecutive symbols, wherein the first number of consecutive symbols in each slot for sidelink is less than all OFDM (Orthogonal Frequency Division Multiplexing) symbols in each slot;

the first device does not expect that the first resource pool comprises a second slot, comprising a number of consecutive symbols for sidelink different from the first number the first device performs resource selection among a plurality of slots in the first resource pool;

the first device selects a first resource in a first slot and a second resource in a third slot; and the first device performs sidelink transmission of a TB (Transport Block) on the first resource and performs sidelink transmission of the TB on the second resource.

18. The method of claim 17, further comprising:
the first resource contains the first number of consecutive symbols excluding a third number of symbols, wherein the third number of symbols is among the first number of consecutive symbols, and wherein the third number of symbols is not used for sidelink data transmission, and/or the third number of symbols is used for any of feedback channel, transition gap, or AGC (Automatic Gain Control) symbol, in the first slot; and/or
the second resource contains the first number of consecutive symbols excluding a fourth number of symbols, wherein the fourth number of symbols is among the first number of consecutive symbols, and wherein the fourth number of symbols is not used for sidelink data transmission, and/or wherein the fourth number of symbols is used for any of feedback channel, transition gap, or AGC symbol, in the third slot; and
the third number is the same or different from the fourth number.

19. The method of claim 18, wherein the first resource starts from the first symbol among the first number of consecutive symbols excluding the third number of symbols, and/or wherein the second resource starts from the first symbol among the first number of consecutive symbols excluding the fourth number of symbols.

20. The method of claim 17, wherein the first symbol among the first number of consecutive symbols in each slot in the first resource pool is used for AGC setting and/or the last symbol among the first number of consecutive symbols in each slot in the first resource pool is used for a transition gap.

21. The method of claim 17, wherein the first symbol among the first number of consecutive symbols in a slot in the first resource pool is the symbol other than the first symbol in the slot.

22. The method of claim 17, wherein for the slot comprising the first number of consecutive symbols for sidelink, the slot comprises downlink symbol(s) and/or uplink symbol(s), wherein the downlink symbol(s) are earlier than the first number of consecutive symbols and/or the uplink symbol(s) are latter than the first number of consecutive symbols.

23. The method of claim 17, wherein the first device is configured with a second resource pool, and wherein the first device is configured with only a second number of consecutive symbols in each slot for sidelink such that each slot in the second resource pool comprises the same second number of consecutive symbols for sidelink; and the second resource pool and the first resource pool are in a same carrier or in different carriers.

* * * * *